US012229463B2

United States Patent
Kokubo

(10) Patent No.: US 12,229,463 B2
(45) Date of Patent: Feb. 18, 2025

(54) DISPLAY METHOD AND DEVICE SELECTING IMAGES FOR REGIONS IN A SCREEN LAYOUT

(71) Applicant: SEIKO EPSON CORPORATION, Tokyo (JP)

(72) Inventor: Koya Kokubo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/472,447

(22) Filed: Sep. 22, 2023

(65) Prior Publication Data
US 2024/0103790 A1     Mar. 28, 2024

(30) Foreign Application Priority Data
Sep. 22, 2022  (JP) .............................. JP2022-151026

(51) Int. Cl.
  *G06F 3/14*   (2006.01)
  *G06F 3/0482*   (2013.01)
  *G06T 7/50*   (2017.01)
(52) U.S. Cl.
  CPC .............. *G06F 3/14* (2013.01); *G06F 3/0482* (2013.01); *G06T 7/50* (2017.01)

(58) Field of Classification Search
  CPC ............... G06F 3/0482; G06F 3/04842; G06F 3/04845; G06T 7/50
  See application file for complete search history.

(56) References Cited

U.S. PATENT DOCUMENTS

2020/0125245 A1\* 4/2020 Osada ........................ G06F 3/14
2021/0072882 A1\* 3/2021 Funderburg ........ G06F 3/04845

FOREIGN PATENT DOCUMENTS

JP        2004-326683 A     11/2004

\* cited by examiner

*Primary Examiner* — Liliana Cerullo
(74) *Attorney, Agent, or Firm* — Dority & Manning, P.A.

(57) ABSTRACT

A display method includes receiving a first operation of selecting one of pieces of layout information for designating a first region and a second region different from the first region from a user, receiving a second operation of determining a first input image to be a base of an image to be displayed in the first region from the user, displaying a part or a whole of an image based on the first input image in the first region designated by the one of the pieces of layout information, receiving a third operation of determining a second input image to be a base of an image to be displayed in the second region from the user, and displaying a part or a whole of an image based on the second input image in the second region designated by the one of the pieces of layout information.

10 Claims, 12 Drawing Sheets

FIG. 5

| FILE NAME | POSITION OF REGION R3 | SHAPE OF REGION R3 | POSITION OF REGION R4 | SHAPE OF REGION R4 |
|---|---|---|---|---|
| Layout_01 | (40, 250) | 600W×400H | (680, 250) | 480W×400H |
| Layout_02 | (40, 150) | 600W×600H | (680, 150) | 480W×600H |
| Layout_03 | (40, 180) | 540W×540H | (620, 180) | 540W×540H |
| Layout_04 | (40, 180) | 660W×660H | (740, 420) | 420W×420H |
| ... | ... | ... | ... | ... |
| Layout_n | (0, 200) | 700W×500H | (700, 200) | 500W×500H |
| ... | ... | ... | ... | ... |
| Layout_N | (40, 40) | 1120W×480H | (40, 560) | 1120W×300H |

DISPLAY METHOD AND DEVICE SELECTING IMAGES FOR REGIONS IN A SCREEN LAYOUT

The present application is based on, and claims priority from JP Application Serial Number 2022-151026, filed Sep. 22, 2022, the disclosure of which is hereby incorporated by reference herein in its entirety.

BACKGROUND

1. Technical Field

The present disclosure relates to a display method and a display device.

2. Related Art

There has been developed a technology related to a method of making a layout of images. In, for example, JP-A-2004-326683, there is disclosed a content delivery system in which a client displays a content represented by content information obtained from a delivery server based on screen layout information. The content information is provided with an identifier to be associated with a variety of types of information included in the screen layout information. In the screen layout information, there is described information related to a display position, a display size, a color, and so on of the content represented by the content information corresponding to the identifier. Therefore, the content represented by the content information is arranged at a position based on the screen layout information.

The content information and the screen layout information are associated with each other by the identifier. Therefore, it is unachievable for the user to freely change the arrangement of the content represented by the content information, and thus, a degree of freedom of layout is low.

SUMMARY

A display method according to an aspect of the present disclosure includes receiving a first operation of selecting one of a plurality of pieces of layout information for designating a first region and a second region different from the first region from a user, receiving a second operation of determining a first input image to be a base of an image to be displayed in the first region from the user, displaying a part or a whole of an image based on the first input image in the first region designated by the one of the plurality of pieces of layout information, receiving a third operation of determining a second input image to be a base of an image to be displayed in the second region from the user, and displaying a part or a whole of an image based on the second input image in the second region designated by the one of the plurality of pieces of layout information.

A display device according to an aspect of the present disclosure includes an optical device, and a processing device, wherein the processing device executes receiving a first operation of selecting one of a plurality of pieces of layout information for designating a first region and a second region different from the first region from a user, receiving a second operation of determining a first input image to be a base of an image to be displayed in the first region from the user, controlling the optical device to thereby display a part or a whole of an image based on the first input image in the first region designated by the one of the plurality of pieces of layout information, receiving a third operation of determining a second input image to be a base of an image to be displayed in the second region from the user, and controlling the optical device to thereby display a part or a whole of an image based on the second input image in the second region designated by the one of the plurality of pieces of layout information.

BRIEF DESCRIPTION OF THE DRAWINGS

FIG. 5 is an explanatory diagram schematically showing a plurality of pieces of layout information 101.

DESCRIPTION OF EXEMPLARY EMBODIMENTS

Figure 1:
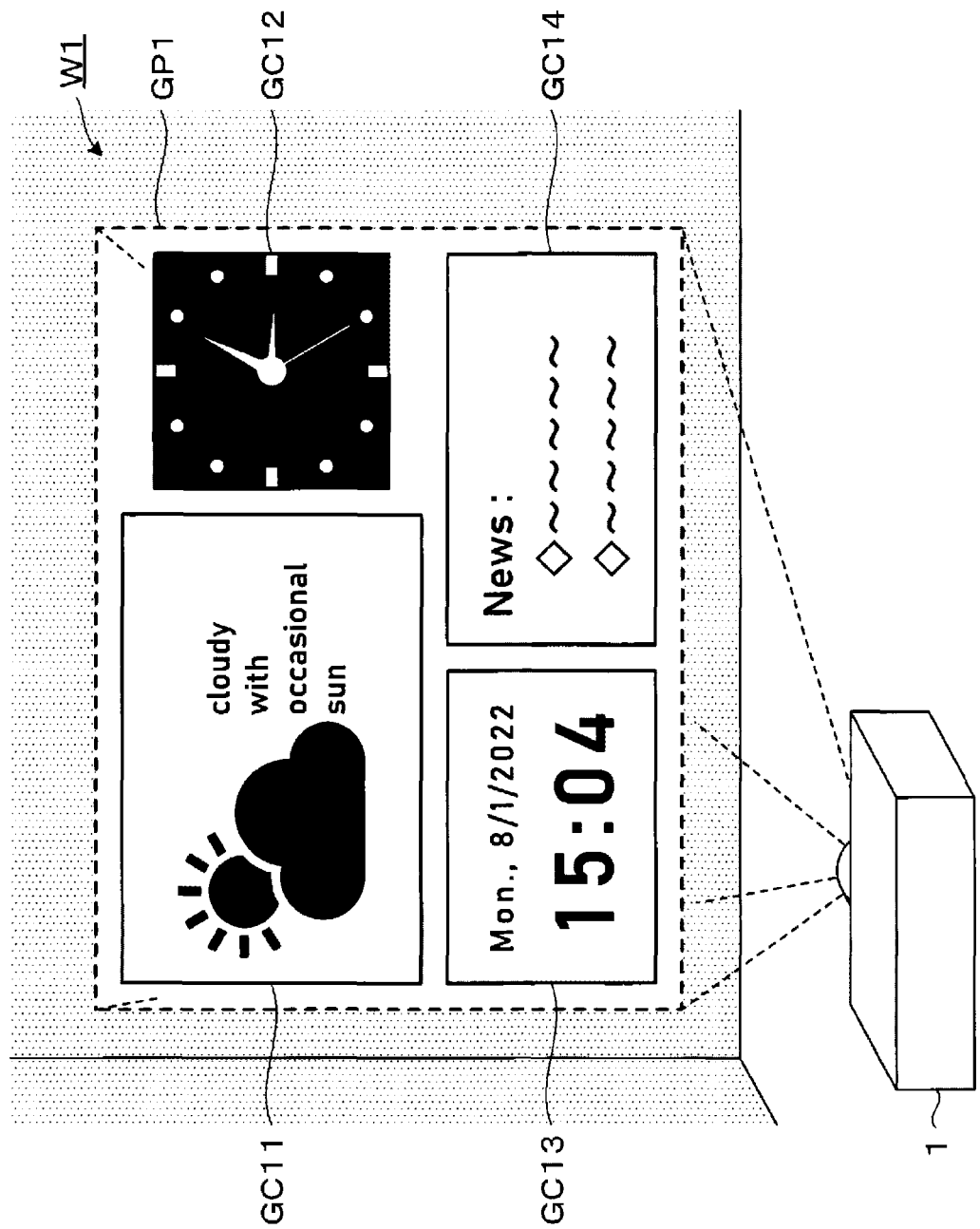
FIG. 1 is a schematic diagram illustrating a state in which a projection image GP1 is displayed.

Some preferred embodiments according to the present disclosure will hereinafter be described with reference to the accompanying drawings. It should be noted that in the drawings, dimensions and scale sizes of parts are different from the reality in some cases, and some portions are shown schematically in order to make understanding easy. Further, the scope or the spirit of the present disclosure is not limited to these aspects unless there is a particular description of limiting the present disclosure in the following explanation.

1. First Embodiment

In the first embodiment, a display method and a display device according to the present disclosure will be described illustrating a projector for displaying a part or the whole of an image in a region designated by layout information. In the present embodiment, the layout information is selected by the user from a plurality of pieces of layout information.

Further, the image to be displayed in the region designated by the layout information is selected by the user from a plurality of images similarly to the layout information.

1.1. Outline of Projector

An outline of the projector 1 according to the first embodiment will hereinafter be described with reference to FIG. 1 and FIG. 2.

FIG. 1 is a schematic diagram illustrating a state in which a projection image GP1 is displayed. The projector 1 is installed in an arrangement capable of projecting projection light toward a wall surface W1. Further, the projector 1 projects the projection light to thereby display the projection image GP1 on the wall surface W1.

The projection image GP1 includes a content image GC11, a content image GC12, a content image GC13, and a content image GC14. The content images GC11 through GC14 are each an image showing a content to be disclosed to the user. Each of the content images GC11 through GC14 can be a still image, or can also be a moving image.

The user of the projector 1 selects an image to be a base of an image to be displayed in a region R1 described later out of the content images GC11 through GC14. Further, the user of the projector 1 selects an image to be a base of an image to be displayed in a region R2 described later out of the content images GC11 through GC14. In the present embodiment, the user selects the content image GC11 as the image to be the base of the image to be displayed in the region R1. Further, the user selects the content image GC12 as the image to be the base of the image to be displayed in the region R2.

Figure 2:
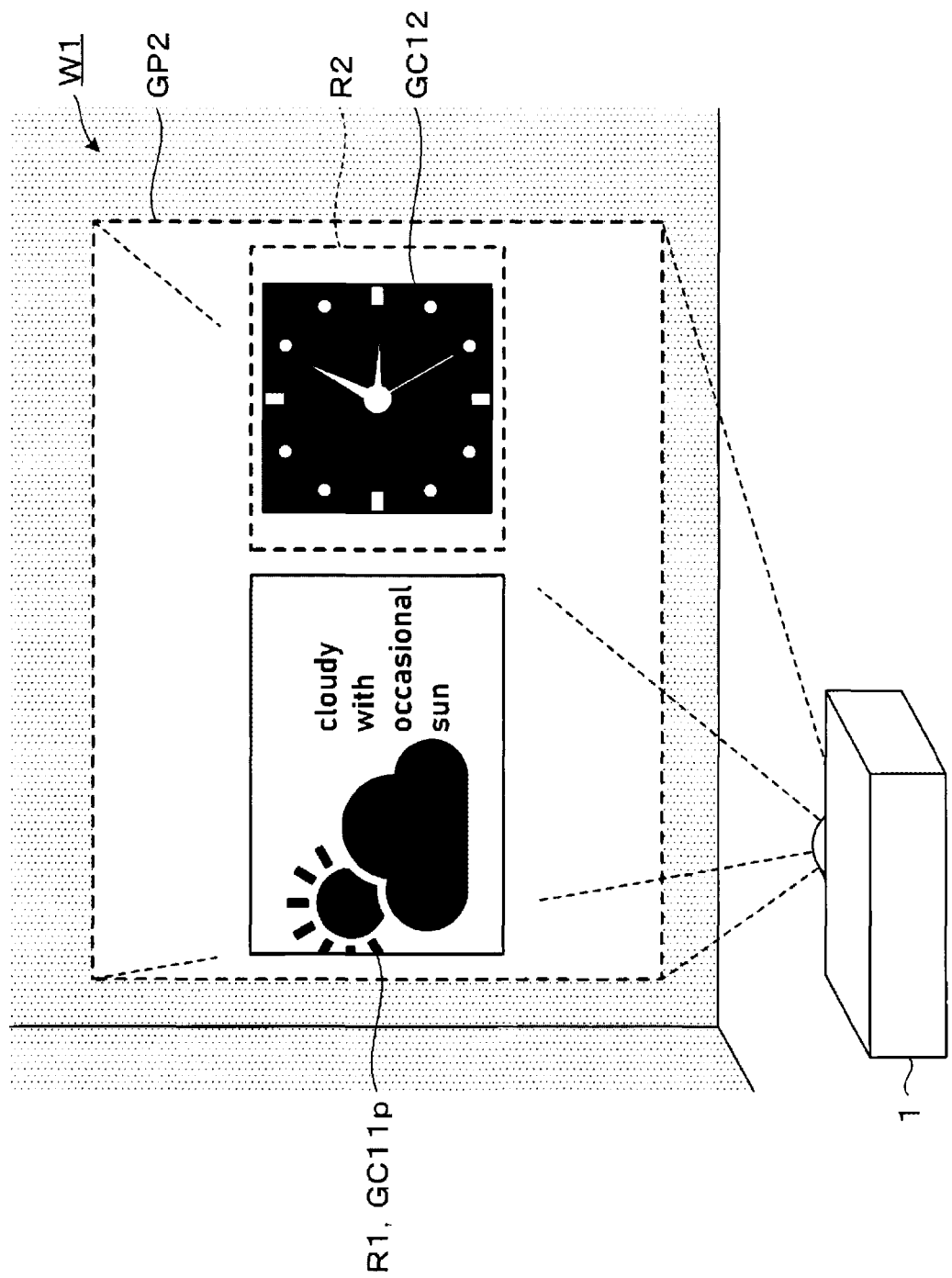
FIG. 2 is a schematic diagram illustrating a state in which a projection image GP2 is displayed.

FIG. 2 is a schematic diagram illustrating a state in which a projection image GP2 is displayed. When the user selects the content image GC11 as the image to be the base of the image to be displayed in the region R1, and selects the content image GC12 as the image to be the base of the image to be displayed in the region R2, the projector 1 projects the projection light to thereby display the projection image GP2 on the wall surface W1.

The projection image GP2 includes a content image GC11$p$ and the content image GC12. The content image GC11$p$ is displayed in the region R1. The content image GC12 is displayed in the region R2.

The content image GC11$p$ is an image obtained by trimming the content image GC11 in accordance with a shape of the region R1. In other words, the content image GC11$p$ is an image based on the content image GC11. In other words, the content image GC11 is an image to be a base of the content image GC11$p$. Further, the content image GC11$p$ is a part of the content image GC11. Further, a shape of the content image GC11$p$ coincides with the shape of the region R1. Further, a shape of the content image GC11 is different from the shape of the region R1.

It should be noted that in the present specification, when a size of the image and a size of the region are different from each other, it is assumed that a shape of the image and a shape of the region are different from each other. For example, when the shape of the image and the shape of the region are in a similarity relationship, and the area of the image and the area of the region are different from each other, the shape of the image and the shape of the region are treated as being different from each other. Therefore, when the shape of the image and the shape of the region are different from each other, includes when the shapes are similar to each other but are different in size from each other, and when the shapes are not similar to each other.

A shape of the content image GC12 is different from the shape of the region R2. Specifically, the shape of the content image GC12 is not similar to the shape of the region R2, but fits into the region R2. Therefore, the content image GC12 is directly displayed in the region R2.

1.2. Configuration and Functions of Projector

A configuration and functions of the projector 1 according to the first embodiment will hereinafter be described with reference to FIG. 3 through FIG. 7.

Figure 3:
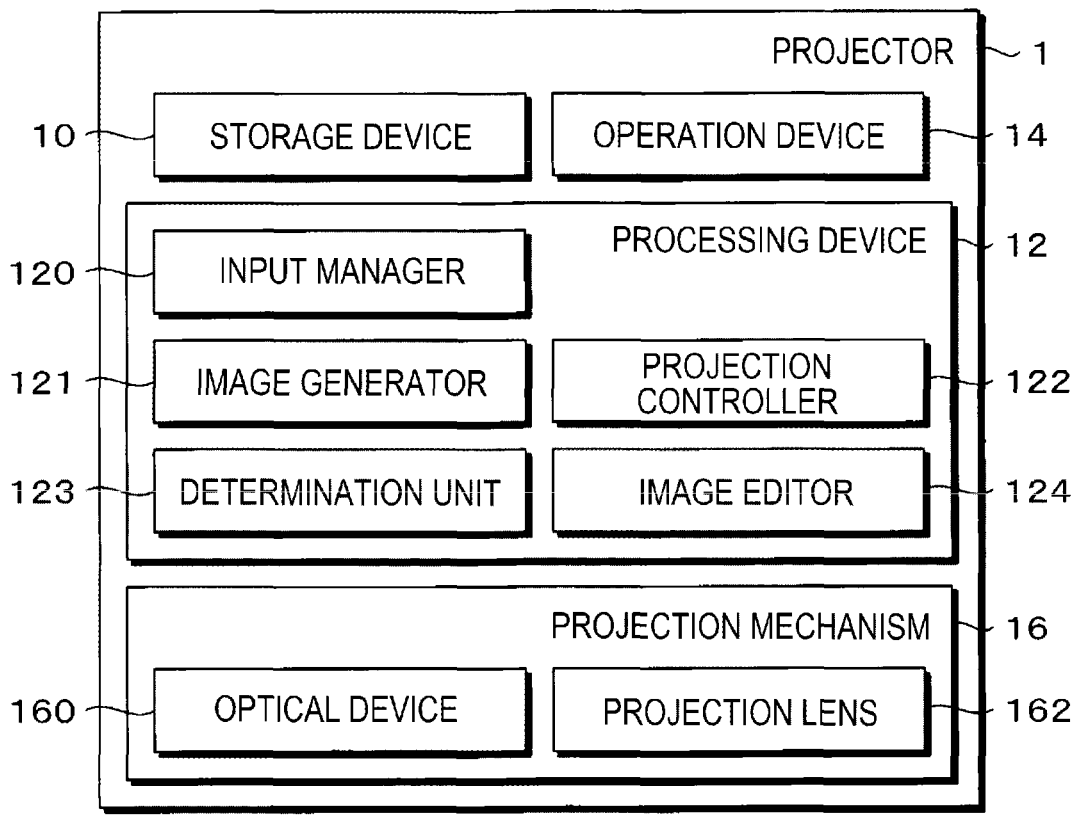
FIG. 3 is a block diagram showing a configuration of a projector 1 according to a first embodiment.

FIG. 3 is a block diagram showing a configuration of the projector 1 according to the first embodiment. The computer 1 is provided with a storage device 10 for storing a variety of types of information, a processing device 12 for controlling an operation of the projector 1, an operation device 14 for receiving an input operation from the user, and a projection mechanism 16 for projecting projection light to thereby display an image on a projection surface. The processing device 12 has functions as an input manager 120, an image generator 121, a projection controller 122, a determination unit 123, and an image editor 124. The projection mechanism 16 is provided with an optical device 160 configured including a light source and a light modulator, and a projection lens 162 for focusing an image on the projection surface.

The storage device 10 is configured including, for example, a volatile memory such as a RAM and a nonvolatile memory such as a ROM. Here, the term RAM is an abbreviation for Random Access Memory. Further, the term ROM is an abbreviation for Read Only Memory.

Figure 4:
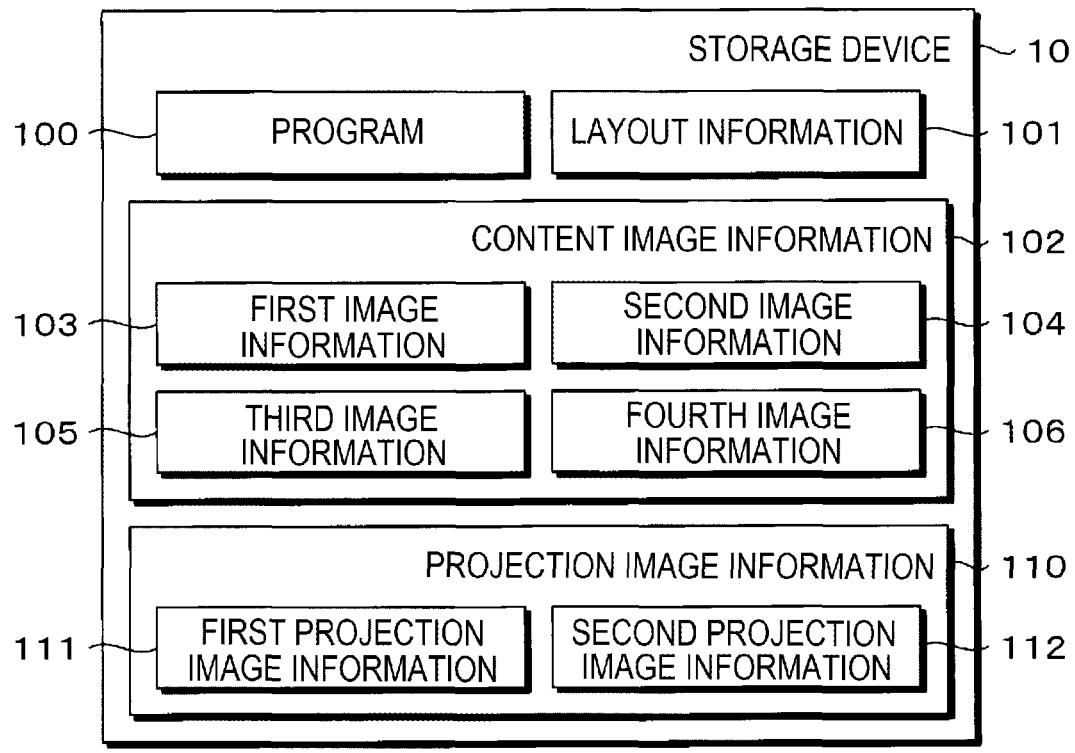
FIG. 4 is a block diagram showing a configuration of a storage device 10 related to the first embodiment.

FIG. 4 is a block diagram showing a configuration of the storage device 10 related to the first embodiment. The nonvolatile memory provided to the storage device 10 stores a program 100 which defines the operation of the projector 1, layout information 101 which defines a region where an image is displayed, content image information 102 representing an image showing a content disclosed to the user, and projection image information 110 representing an image to be projected on the projection surface. The content image information 102 includes first image information 103, second image information 104, third image information 105, and fourth image information 106. The projection image information 110 includes first projection image information 111 and second projection image information 112. It should be noted that in the present embodiment, the nonvolatile memory provided to the storage device 10 stores a plurality of pieces of layout information 101.

The volatile memory provided to the storage device 10 is used by the processing device 12 as a work area when executing the program 100.

It should be noted that a part or the whole of the storage device 10 can be disposed in an external storage device, an external server, or the like. Further, a part or the whole of the variety of types of information stored in the storage device 10 can be stored in advance in the storage device 10, or can also be obtained from the external storage device, the external server, or the like.

FIG. 5 is an explanatory diagram schematically showing the plurality of pieces of layout information 101. In FIG. 5, there is schematically illustrated a state in which the nonvolatile memory provided to the storage device 10 stores N pieces of layout information 101. Here, the value N is an integer equal to or larger than 2.

In FIG. 5, in order to distinguish the N pieces of layout information 101 from each other, the reference symbols of the layout information 101 are respectively attached with suffixes "1," "2," "3,"  . . . , "n,"  . . . , "N" representing numbers. For example, "4" attached as the suffix in the layout information 101-4 represents a fourth piece of the layout information 101. Further, "n" attached as the suffix in the layout information 101-$n$ represents an n-th piece of the layout information 101. Here, the value n is an integer fulfilling 1≤n≤N. It should be noted that the value n in the example shown in FIG. 5 is an integer no smaller than 5 and smaller than N. Further, the value N is an integer equal to or larger than 6.

The pieces of layout information 101-1 through 101-N are each information for designating two regions where images are displayed. Specifically, the pieces of layout information 101-1 through 101-N are each information for designating a position and a shape of one of the two regions where the images are displayed, and a position and a shape of the other of the two regions. More specifically, the pieces of layout information 101-1 through 101-N are each information for designating a position and a shape of a region R3 in an image represented by the second projection image information 112, and a position and a shape of a region R4 in the image represented by the second projection image information 112. The explanation related to the region R3 and the region R4 will be described later. It should be noted that in each of the pieces of layout information 101-1 through 101-N, as the position of the region where the image is displayed, it is possible to designate, for example, a coordinate of any one of vertexes of that region, or a coordinate of the geometric center of that region. In the present embodiment, each of the pieces of layout information 101-1 through 101-N designates a coordinate of an upper left vertex of the region R3 as the position of the region R3. Further, each of the pieces of layout information 101-1 through 101-N designates a coordinate of an upper left vertex of the region R4 as the position of the region R4.

The user selects one of the pieces of layout information 101. In the present embodiment, it is assumed when the user selects the layout information 101-1 out of the pieces of layout information 101-1 through 101-N. It should be noted that the layout information 101 selected by the user is not limited to the layout information 101-1, and can also be other pieces of layout information 101 than the layout information 101-1.

Figure 6:
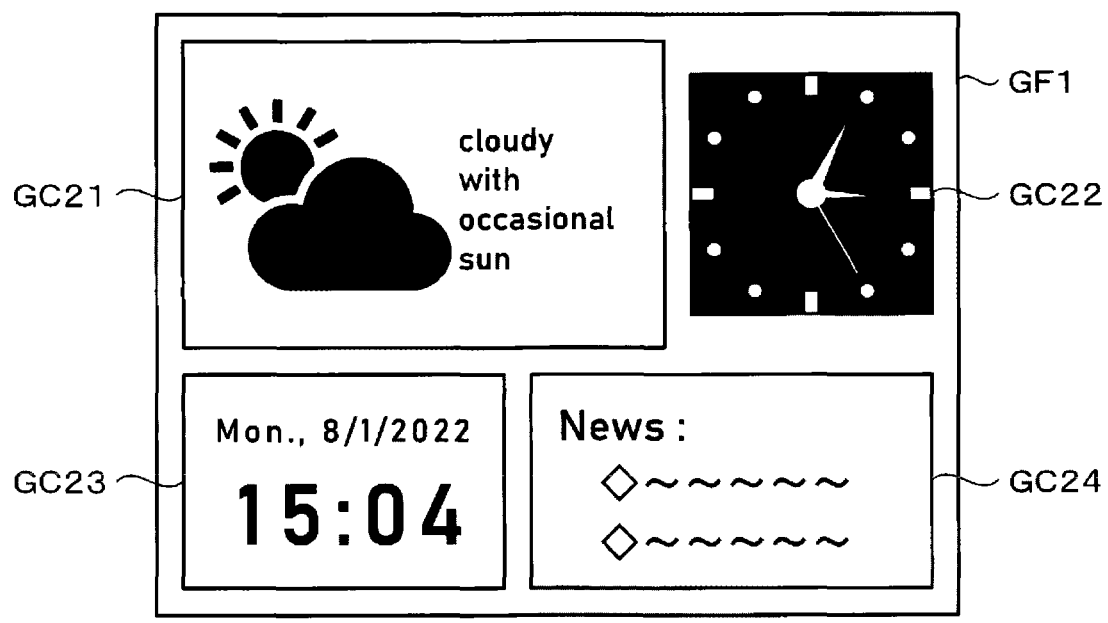
FIG. 6 is a schematic diagram illustrating an example of an image represented by first projection image information 111.

FIG. 6 is a schematic diagram illustrating an example of an image represented by the first projection image information 111. In the present embodiment, the first projection image information 111 represents an image GF1. The image GF1 includes a plurality of images. Specifically, the image GF1 includes a content image GC21, a content image GC22, a content image GC23, and a content image GC24. Further, the image GF1 is an image corresponding to the projection image GP1. The projector 1 makes the projection mechanism 16 project the projection light based on the first projection image information 111 to thereby display the projection image GP1 on the wall surface W1. In other words, the projector 1 makes the projection mechanism 16 project the image GF1 to thereby display the projection image GP1 on the wall surface W1. Further, in other words, the projector 1 makes the projection mechanism 16 project the image GF1 to thereby display the content image GC11, the content image GC12, the content image GC13, and the content image GC14 on the wall surface W1.

The content image GC21 is an image represented by the first image information 103. Further, the content image GC21 is an image showing a predetermined content. Further, the content image GC21 is an image corresponding to the content image GC11.

The content image GC22 is an image represented by the second image information 104. Further, the content image GC22 is an image showing a predetermined content. Further, the content image GC22 is an image corresponding to the content image GC12.

The content image GC23 is an image represented by the third image information 105. Further, the content image GC23 is an image showing a predetermined content. Further, the content image GC23 is an image corresponding to the content image GC13.

The content image GC24 is an image represented by the fourth image information 106. Further, the content image GC24 is an image showing a predetermined content. Further, the content image GC24 is an image corresponding to the content image GC14.

The projector 1 generates the first projection image information 111 based on the content image information 102. Specifically, the projector 1 generates the first projection image information 111 based on the first image information 103, the second image information 104, the third image information 105, and the fourth image information 106. In other words, the projector 1 generates the image GF1 based on the content image GC21, the content image GC22, the content image GC23, and the content image GC24.

Figure 7:
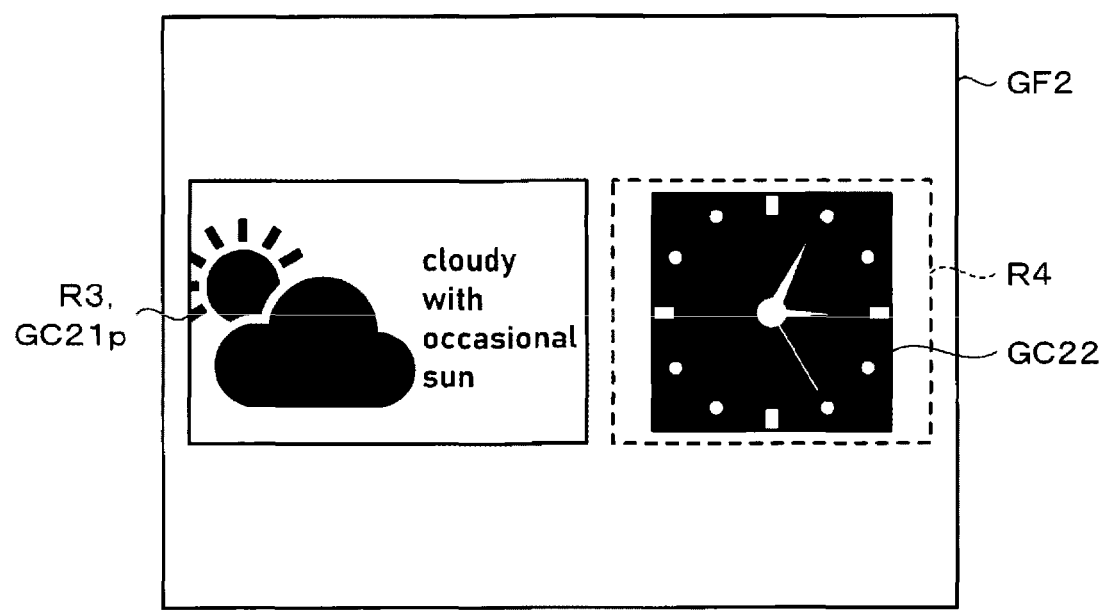
FIG. 7 is a schematic diagram illustrating an example of an image represented by second projection image information 112.

FIG. 7 is a schematic diagram illustrating an example of an image represented by the second projection image information 112. In the present embodiment, the second projection image information 112 represents the image GF2. The image GF2 includes a content image GC21$p$ and the content image GC22. The content image GC21$p$ is arranged in the region R3 in the image GF2. The content image GC22 is arranged in the region R4 in the image GF2. Further, the image GF2 is an image corresponding to the projection image GP2. The projector 1 makes the projection mechanism 16 project the projection light based on the second projection image information 112 to thereby display the projection image GP2 on the wall surface W1. In other words, the projector 1 makes the projection mechanism 16 project the image GF2 to thereby display the projection image GP2 on the wall surface W1.

The content image GC21$p$ is an image obtained by trimming the content image GC21 in accordance with the shape of the region R3. In other words, the content image GC21$p$ is an image based on the content image GC21. In other words, the content image GC21 is an image to be a base of the content image GC21$p$. Further, the content image GC21$p$ is a part of the content image GC21. Further, a shape of the content image GC21$p$ coincides with the shape of the region R3. Further, a shape of the content image GC21 is different from the shape of the region R3. Further, the content image GC21$p$ is an image corresponding to the content image GC11$p$.

When the user selects the content image GC11 as the image to be the base of the image to be displayed in the region R1, and selects the content image GC12 as the image to be the base of the image to be displayed in the region R2, the projector 1 generates the second projection image information 112 based on the first image information 103 representing the content image GC21 corresponding to the content image GC11, the second image information 104 representing the content image GC22 corresponding to the content image GC12, and the layout information 101-1. In other words, the projector 1 generates the image GF2 based on the content image GC21, the content image GC22, and the layout information 101-1.

The region R3 and the region R4 in the image represented by the second projection image information 112 are designated by the layout information 101. The region R3 is a region corresponding to the region R1. The region R4 is a region corresponding to the region R2. In other words, the layout information 101 is information designating the region R1 and the region R2. Specifically, the layout information 101 is information designating a position and a shape of the region R1, and a position and a shape of the region R2. When one of the pieces of layout information 101 is selected by the user, the position and the shape of the region R1 and the position and the shape of the region R2 are defined based on that one of the pieces of layout information 101. In the present embodiment, the region R3 and the region R4 are designated by the layout information 101-1. In other words, the region R1 and the region R2 are designated by the layout information 101-1.

Going back to FIG. 3, the processing device 12 is configured including a single CPU or a plurality of CPUs. It should be noted that the processing device 12 can be a device provided with a programmable logic device such as an FPGA instead of, or in addition to the CPU. Here, CPU is an abbreviation for Central Processing Unit, and FPGA is an abbreviation for Field-Programmable Gate Array.

The processing device 12 functions as the input manager 120, the image generator 121, the projection controller 122, the determination unit 123, and the image editor 124 shown in FIG. 3 by the CPU and so on provided to the processing device 12 executing the program 100.

The input manager 120 controls the operation device 14 to thereby obtain operation data representing the content of the operation received from the user. Further, the input manager 120 performs a variety of determinations related to the operation received from the user based on the operation data thus obtained.

In the present embodiment, the input manager 120 obtains the operation data representing a content of an operation of selecting one of the pieces of layout information 101. Further, the input manager 120 obtains the operation data representing a content of an operation of determining the image to be the base of the image to be displayed in the region R1. Further, the input manager 120 obtains the operation data representing a content of an operation of determining the image to be the base of the image to be displayed in the region R2.

In the present embodiment, an operation of selecting one of the pieces of layout information 101 is referred to as a "first operation" in some cases. Further, an operation of determining the image to be the base of the image to be displayed in the region R1 is referred to as a "second operation" in some cases. The second operation includes an operation of selecting the image to be the base of the image to be displayed in the region R1 out of the content images GC11 through GC14. Further, an operation of determining the image to be the base of the image to be displayed in the region R2 is referred to as a "third operation" in some cases. The third operation includes an operation of selecting the image to be the base of the image to be displayed in the region R2 out of the content images GC11 through GC14.

The image generator 121 generates the first projection image information 111 based on the content image information 102. In the present embodiment, the image generator 121 generates the first projection image information 111 based on the first image information 103, the second image information 104, the third image information 105, and the fourth image information 106. In other words, the image generator 121 generates the image GF1 based on the content image GC21, the content image GC22, the content image GC23, and the content image GC24.

Further, the image generator 121 generates the second projection image information 112 based on the operation data representing the content of the first operation, the operation data representing the content of the second operation, the operation data representing the content of the third operation, the layout information 101, and the content image information 102. In the present embodiment, the user selects the layout information 101-1 out of the pieces of layout information 101-1 through 101-N with the first operation. Further, the user selects the content image GC11 out of the content images GC11 through GC14 with the second operation. Further, the user selects the content image GC12 out of the content images GC11 through GC14 with the third operation. In other words, the image generator 121 generates the second projection image information 112 based on the layout information 101-1, the first image information 103 representing the content image GC21 corresponding to the content image GC11, and the second image information 104 representing the content image GC22 corresponding to the content image GC12. In other words, the image generator 121 generates the image GF2 based on the layout information 101-1, the content image GC21, and the content image GC22.

It should be noted that when the shape of the image to be the base of the image to be displayed in the region R1 is different from the shape of the region R1, and when the image to be the base of the image to be displayed in the region R1 does not fit into the region R1 is trimmed, the image to be the base of the image to be displayed in the region R1 is trimmed by the image editor 124 described later in accordance with the shape of the region R1. When the image to be the base of the image to be displayed in the region R1, the image generator 121 generates the second projection image information 112 based on the image trimmed in accordance the shape of the region R1.

The projection controller 122 controls the projection mechanism 16 to thereby project the projection light for displaying the image to the projection surface. In the present embodiment, the projection controller 122 controls the projection mechanism 16 to thereby project the projection light for displaying the image to wall surface W1. Specifically, the projection controller 122 makes the projection mechanism 16 project the projection light based on the projection image information 110 to thereby display the image on the wall surface W1. More specifically, the projection controller 122 makes the projection mechanism 16 project the projection light based on the first projection image information 111 to thereby display the projection image GP1 on the wall surface W1. Further, the projection controller 122 makes the projection mechanism 16 project the projection light based on the second projection image information 112 to thereby display the projection image GP2 on the wall surface W1.

The determination unit 123 determines whether or not an image to be a base of an image to be arranged in the region R3 fails to fit into the region R3 based on the operation data representing the content of the first operation, the operation data representing the content of the second operation, the layout information 101, and the content image information 102. In other words, the determination unit 123 determines whether or not it is necessary to trim the image to be the base of the image to be arranged in the region R3. In other words, the determination unit 123 determines whether or not the image to be the base of the image to be displayed in the region R1 fails to fit into the region R1. In other words, the determination unit 123 determines whether or not it is necessary to trim the image to be the base of the image to be displayed in the region R1. In the present embodiment, the determination unit 123 determines whether or not the content image GC21 fails to fit into the region R3 based on the layout information 101-1 and the first image information 103. In other words, the determination unit 123 determines whether or not it is necessary to trim the content image GC21. In other words, the determination unit 123 determines whether or not the content image GC11 fails to fit into the region R1 based on the layout information 101-1 and the first image information 103. In other words, the determination unit 123 determines whether or not it is necessary to trim the content image GC11.

When it is necessary to trim the image to be the base of the image to be arranged in the region R3, the image editor 124 trims the image to be the base of the image to be arranged in the region R3 in accordance with the shape of the region R3. In other words, when it is necessary to trim the image to be the base of the image to be displayed in the region R1, the image editor 124 trims the image to be the base of the image to be displayed in the region R1 in accordance with the shape of the region R1. Specifically, the image editor 124 deletes a portion which fails to fit into the region R3 in the image to be the base of the image to be arranged in the region R3 to thereby generate the image to be arranged in the region R3. In other words, the image editor 124 deletes a portion which fails to fit into the region R1 in the image to be the base of the image to be displayed in the region R1 to thereby generate the image to be displayed in the region R1. In the present embodiment, the image editor 124 trims the content image GC21 in accordance with the shape of the region R3 to thereby generate the content image GC21p. In other words, the image editor 124 trims the content image GC11 in accordance with the shape of the region R1 to thereby generate the content image GC11p.

The operation device 14 receives an input operation to the projector 1 from the user of the projector 1. The operation device 14 is configured including, for example, a touch panel or operation buttons provided to the chassis. When the operation device 14 is configured including the touch panel, the operation device 14 outputs data representing a touch position detected to the processing device 12. Further, when the operation device 14 is configured including the operation buttons, the operation device 14 outputs data for identifying the button which is held down to the processing device 12. Further, the operation device 14 can be configured including a receiving device for receiving an operation signal output from a remote controller based on an operation of the user. When the operation device 14 is configured including the receiving device, the operation device 14 outputs data represented by the operation signal received from the remote controller to the processing device 12. Thus, the content of the input operation to the projector 1 is transmitted to the processing device 12. In the present embodiment, the operation device 14 receives the first operation from the user. Then, the operation device 14 outputs the operation data representing the content of the first operation to the processing device 12. Further, the operation device 14 receives the second operation from the user. Then, the operation device 14 outputs the operation data representing the content of the second operation to the processing device 12. Further, the operation device 14 receives the third operation from the user. Then, the operation device 14 outputs the operation data representing the content of the third operation to the processing device 12.

The optical device 160 is a device for emitting light for displaying an image. Specifically, the optical device 160 includes a light source, and a light modulator for forming the projection light based on a signal input from the processing device 12. The light source includes, for example, a halogen lamp, a xenon lamp, a super-high pressure mercury lamp, an LED, or a laser source. The light modulator includes, for example, a single DMD or a plurality of DMDs, or a liquid crystal panel. It should be noted that the optical device 160 is not limited to what includes the light source and the light modulator, and can be configured including what is obtained by integrating the functions of the light source and the light modulator with each other. As what is obtained by integrating the functions of the light source and the light modulator with each other, there can be cited, for example, an organic EL panel and a micro LED panel. Here, LED is an abbreviation for Light Emitting Diode, DMD is an abbreviation for Digital Mirror Device, and EL is an abbreviation for Electro-Luminescence.

The projection lens 162 is a single lens or a plurality of lenses for projecting the projection light emitted from the optical device 160 to the projection surface to form an image on the projection surface.

The projection mechanism 16 projects the projection light for displaying the image on the projection surface under the control of the projection controller 122. In the present embodiment, the projection mechanism 16 projects the projection light for displaying the image on the wall surface W1. Specifically, the projection mechanism 16 projects the image GF1 on the wall surface W1 to thereby display the projection image GP1. Further, the projection mechanism 16 projects the image GF2 on the wall surface W1 to thereby display the projection image GP2.

1.3. Operation of Projector

Figure 8:
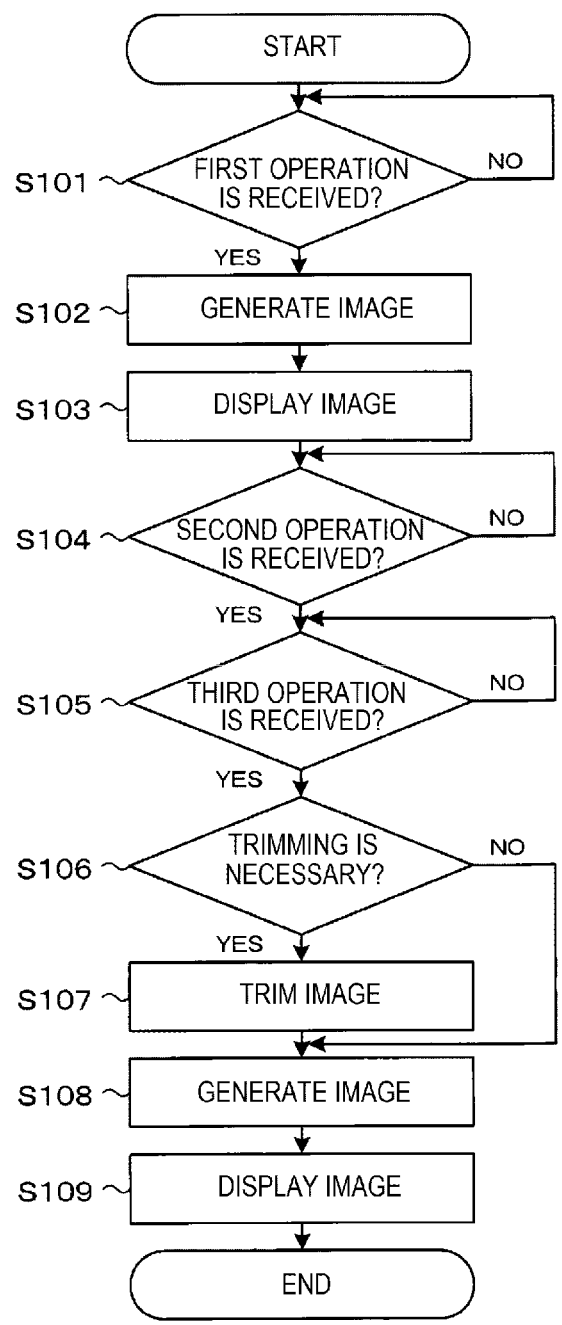
FIG. 8 is a flowchart for explaining an operation of the projector 1 according to the first embodiment.

FIG. 8 is a flowchart for explaining an operation of the projector 1 according to the first embodiment. A series of actions shown in that flowchart is started when, for example, the power of the projector 1 is turned ON, and then the operation device 14 receives the input operation related to a start of the operation from the user. It should be noted that it is assumed that the installation environment of the projector 1 does not change during the execution of the series of actions shown in the flowchart of FIG. 8.

In the step S101, the input manager 120 determines whether or not the operation device 14 has received the first operation from the user based on the operation data obtained from the operation device 14. When the operation device 14 has received the first operation from the user, namely YES is determined in the step S101, the input manager 120 proceeds with the process to the step S102. Further, when the operation device 14 has not received the first operation from the user, namely NO is determined in the step S101, the input manager 120 executes the processing in the step S101 once again.

In the present embodiment, the user selects the layout information 101-1 out of the pieces of layout information 101-1 through 101-N with the first operation. The input manager 120 obtains the operation data representing the content of the operation of selecting the layout information 101-1 out of the pieces of layout information 101-1 through 101-N from the operation device 14.

In the step S102, the image generator 121 generates the first projection image information 111 based on the content image information 102. Specifically, the image generator 121 generates the first projection image information 111 based on the first image information 103, the second image information 104, the third image information 105, and the fourth image information 106. In other words, the image generator 121 generates the image GF1 based on the content image GC21, the content image GC22, the content image GC23, and the content image GC24.

In the step S103, the projection controller 122 makes the projection mechanism 16 project the projection light based on the first projection image information 111 to thereby display the projection image GP1 on the wall surface W1.

In the step S104, the input manager 120 determines whether or not the operation device 14 has received the second operation from the user based on the operation data obtained from the operation device 14. When the operation device 14 has received the second operation from the user, namely YES is determined in the step S104, the input manager 120 proceeds with the process to the step S105. Further, when the operation device 14 has not received the second operation from the user, namely NO is determined in the step S104, the input manager 120 executes the processing in the step S104 once again.

In the present embodiment, the user selects the content image GC11 out of the content images GC11 through GC14 with the second operation. The input manager 120 obtains the operation data representing the content of the operation of selecting the content image GC11 out of the content images GC11 through GC14 from the operation device 14.

In the step S105, the input manager 120 determines whether or not the operation device 14 has received the third operation from the user based on the operation data obtained from the operation device 14. When the operation device 14 has received the third operation from the user, namely YES is determined in the step S105, the input manager 120 proceeds with the process to the step S106. Further, when the operation device 14 has not received the third operation from the user, namely NO is determined in the step S105, the input manager 120 executes the processing in the step S105 once again.

In the present embodiment, the user selects the content image GC12 out of the content images GC11 through GC14 with the third operation. The input manager 120 obtains the operation data representing the content of the operation of selecting the content image GC12 out of the content images GC11 through GC14 from the operation device 14.

In the step S106, the determination unit 123 determines whether or not it is necessary to trim the image to be the base of the image to be arranged in the region R3 based on the operation data representing the content of the first operation, the operation data representing the content of the second operation, the layout information 101, and the content image information 102. In other words, the determination unit 123 determines whether or not it is necessary to trim the image to be the base of the image to be displayed in the region R1 based on the operation data representing the content of the first operation, the operation data representing the content of the second operation, the layout information 101, and the content image information 102. When it is necessary to trim the image to be the base of the image to be arranged in the region R3, in other words, when it is necessary to trim the image to be the base of the image to be displayed in the region R1, namely YES is determined in the step S106, the determination unit 123 proceeds with the process to the step S107. When it is unnecessary to trim the image to be the base of the image to be arranged in the region R3, in other words, when it is unnecessary to trim the image to be the base of the image to be displayed in the region R1, namely NO is determined in the step S106, the determination unit 123 proceeds with the process to the step S108.

Specifically, the determination unit 123 determines whether or not it is necessary to trim the content image GC21 based on the layout information 101-1 and the first image information 103. In other words, the determination unit 123 determines whether or not it is necessary to trim the content image GC11 based on the layout information 101-1 and the first image information 103. Since the content image GC21 fails to fit into the region R3, and it is necessary for the image editor 124 to trim the content image GC21, the determination unit 123 proceeds with the process to the step S107.

In the step S107, the image editor 124 trims the image to be the base of the image to be arranged in the region R3 in accordance with the shape of the region R3. In other words, the image editor 124 trims the image to be the base of the image to be displayed in the region R1 in accordance with the shape of the region R1.

Specifically, the image editor 124 trims the content image GC21 in accordance with the shape of the region R3 designated by the layout information 101-1 to thereby generate the content image GC21$p$. In other words, the image editor 124 trims the content image GC11 in accordance with the shape of the region R1 designated by the layout information 101-1 to thereby generate the content image GC11$p$.

In the step S108, the image generator 121 generates the second projection image information 112 based on the operation data representing the content of the first operation, the operation data representing the content of the second operation, the operation data representing the content of the third operation, the layout information 101, and the content image information 102. Specifically, the image generator 121 generates the second projection image information 112 based on the layout information 101-1, the first image information 103, and the second image information 104.

Since the content image GC21 is trimmed in the step S107, the image generator 121 generates the image GF2 based on the layout information 101-1, the content image GC21$p$, and the content image GC22 in other words.

In the step S109, the projection controller 122 makes the projection mechanism 16 project the projection light based on the second projection image information 112 to thereby display the projection image GP2 on the wall surface W1. In other words, the projection controller 122 displays the content image GC11$p$ in the region R1 designated by the layout information 101-1. Further, the projection controller 122 displays the content image GC12 in the region R2 designated by the layout information 101-1.

After the processing in the step S109 is executed, the processing device 12 terminates the series of actions shown in the flowchart of FIG. 8.

As described hereinabove, according to the first embodiment, the projector 1 displays the image based on the image selected by the user based on the layout information 101 selected by the user out of the plurality of pieces of layout information 101. In other words, it is possible for the projector 1 to increase the degree of freedom of the layout of the images to be displayed compared to when the layout of the images to be displayed is associated with the images themselves to be displayed.

Further, according to the first embodiment, when the image selected by the user fails to fit into the region where the image is to be displayed, the projector 1 displays the image selected by the user after trimming that image in accordance with the shape of that region. In other words, even when the shape of the region designated by the layout information 101 and the shape of the image selected by the user fail to coincide with each other, it is possible for the user to display the images in the layout designated by the layout information 101 selected by the user.

As described hereinabove, the display method according to the first embodiment includes receiving the first operation of selecting the layout information 101-1 out of the pieces of layout information 101-1 through 101-N for designating the region R1 and the region R2 different from the region R1 from the user, receiving the second operation of determining the content image GC11 to be the base of the image to be displayed in the region R1 from the user, displaying a part or the whole of the image based on the content image GC11 in the region R1 designated by the layout information 101-1, receiving the third operation of determining the content image GC12 to be the base of the image to be displayed in the region R2 from the user, and displaying a part or the whole of the image based on the content image GC12 in the region R2 designated by the layout information 101-1.

Further, the projector 1 according to the first embodiment includes the optical device 160, and the processing device 12, wherein the processing device 12 executes receiving the first operation of selecting the layout information 101-1 out of the pieces of layout information 101-1 through 101-N for designating the region R1 and the region R2 different from the region R1 from the user, receiving the second operation of determining the content image GC11 to be the base of the image to be displayed in the region R1 from the user, controlling the optical device 160 to display a part or the whole of the image based on the content image GC11 in the region R1 designated by the layout information 101-1, receiving the third operation of determining the content image GC12 to be the base of the image to be displayed in the region R2 from the user, and controlling the optical device 160 to display a part or the whole of the image based on the content image GC12 in the region R2 designated by the layout information 101-1.

In other words, the projector 1 displays the image based on the image selected by the user based on the layout information 101 selected by the user out of the plurality of pieces of layout information 101. Thus, it is possible for the projector 1 to increase the degree of freedom of the layout of the images to be displayed compared to when the layout of the images to be displayed is associated with the images themselves to be displayed. Therefore, it is possible for the user to display the images selected by the user him- or herself in the layout based on the layout information 101 selected by the user him- or herself.

It should be noted that in the first embodiment, the projector 1 is an example of a "display device," the optical device 160 is an example of an "optical device," the processing device 12 is an example of a "processing device," the region R1 is an example of a "first region," the region R2 is an example of a "second region," the pieces of layout information 101-1 through 101-N are an example of a "plurality of pieces of layout information," the layout information 101-1 is an example of "one of pieces of layout information," the content image GC11 is an example of a "first input image," and the content image GC12 is an example of a "second input image." Further, an example of "a part or the whole of an image based on the first input image" is the content image GC11$p$. Further, an example of "a part or the whole of an image based on the second input image" is the content image GC12.

Further, the display method according to the first embodiment further includes displaying the content images GC11 through GC14 including the content image GC11 and the content image GC12, wherein the second operation includes an operation of selecting the content image GC11 out of the content images GC11 through GC14, and the third operation includes an operation of selecting the content image GC12 out of the content images GC11 through GC14.

Specifically, the projector 1 displays the images to be selected by the user as a list. Thus, it is possible for the user to figure out a display aspect of the images to be selected by the user.

It should be noted that in the first embodiment, the content images GC11 through GC14 are an example of a "plurality of input images."

Further, in the display method according to the first embodiment, when the shape of the region R1 and the shape of the content image GC11 are different from each other, displaying a part or the whole of the image based on the content image GC11 includes displaying a part or the whole of the content image GC11 in the region R1 in accordance with the shape of the region R1.

Specifically, when the content image GC11 selected by the user fits into the region R1, the projector 1 displays the content image GC11 in the region R1. Further, when the content image GC11 selected by the user fails to fit into the region R1, the projector 1 displays the content image GC11$p$ as a part of the content image GC11 in the region R1. Thus, even when the shape of the region R1 designated by the layout information 101 selected by the user and the shape of the content image GC11 selected by the user are different from each other, it is possible for the projector 1 to display the images in the layout designated by the layout information 101 selected by the user.

It should be noted that in the first embodiment, an example of "a part or the whole of the first input image" is the content image GC11$p$.

2. Second Embodiment

A second embodiment of the present disclosure will hereinafter be described. It should be noted that in each of the aspects hereinafter illustrated, regarding the elements substantially the same in operation and function as those in the first embodiment, the symbols used in the description of the first embodiment are diverted, and the detailed description of each of such elements are arbitrarily omitted.

In the second embodiment, the display method and the display device according to the present disclosure will be described illustrating a projector which deforms an image selected by the user in accordance with a shape of a region where the image is displayed when the shape of the region where the image is displayed and a shape of the image selected by the user are different from each other. In the present embodiment, an aspect ratio of the image deformed in accordance with the shape of the region where the image is displayed coincides with an aspect ratio of the image which has not been deformed.

It should be noted that in the second embodiment, it is assumed when the user selects the layout information 101-1 out of the pieces of layout information 101-1 through 101-N similarly to the first embodiment.

Figure 9:
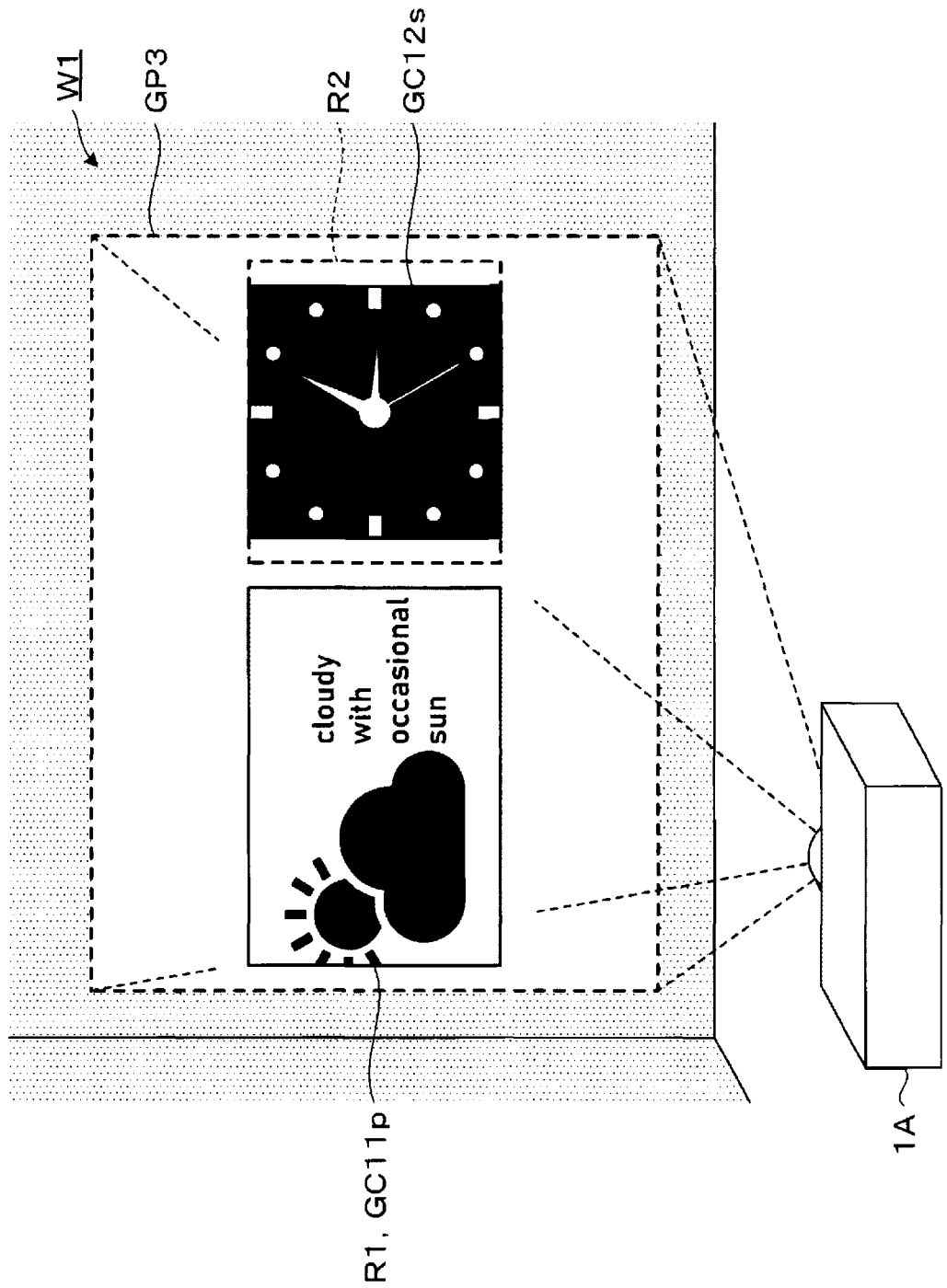
FIG. 9 is a schematic diagram illustrating a state in which a projection image GP3 is displayed.

FIG. 9 is a schematic diagram illustrating a state in which a projection image GP3 is displayed. When the user selects the content image GC11$p$ as the image to be the base of the image to be displayed in the region R1, and selects the content image GC12 as the image to be the base of the image to be displayed in the region R2, the projector 1A according to the second embodiment projects the projection light to thereby display the projection image GP3 on the wall surface W1.

The projection image GP3 is configured similarly to the projection image GP2 except the point that a content image GC12s is included instead of the content image GC12. Specifically, the content image GC11p is displayed in the region R1. Further, the content image GC12s is displayed in the region R2.

The content image GC12s is an image obtained by expanding the content image GC12 in accordance with the shape of the region R2. In other words, the content image GC12s is an image based on the content image GC12. In other words, the content image GC12 is an image to be a base of the content image GC12s. Further, the content image GC12s is an image obtained by deforming the content image GC12. Further, the shape of the content image GC12s is a shape which fits into the region R2. Further, an aspect ratio of the content image GC12s coincides with an aspect ratio of the content image GC12.

Figure 10:
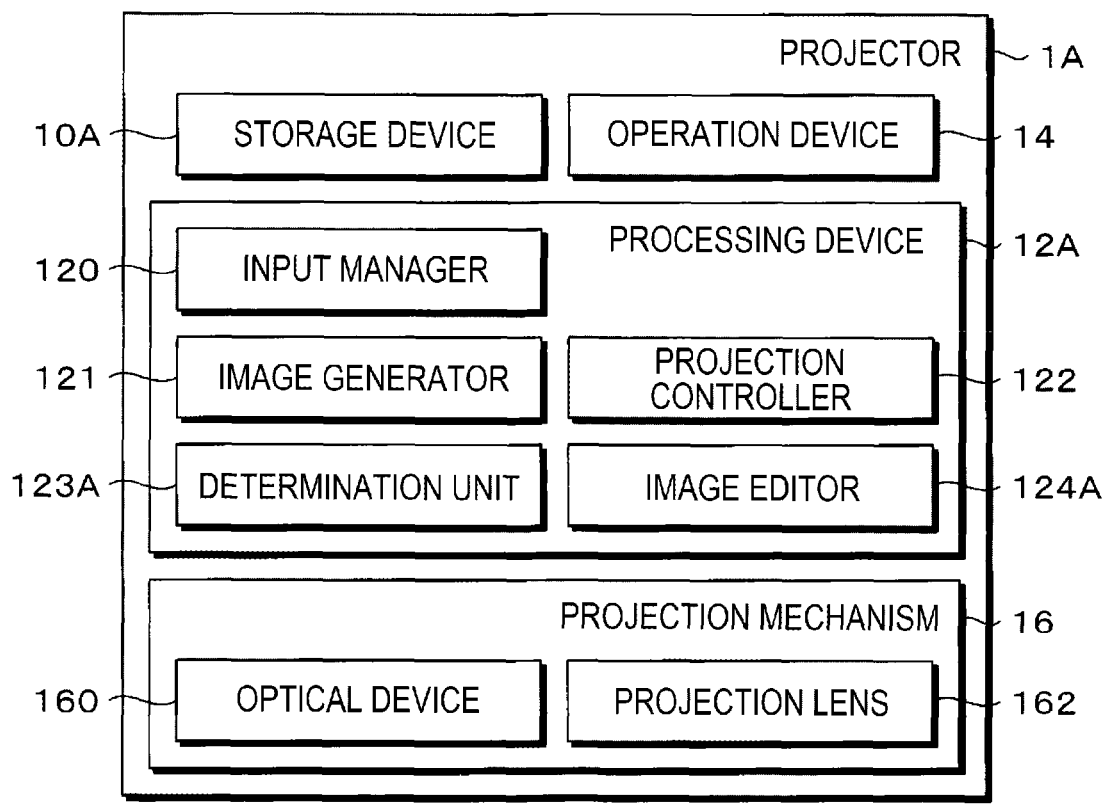
FIG. 10 is a block diagram showing a configuration of a projector 1A according to a second embodiment.
Figure 11:
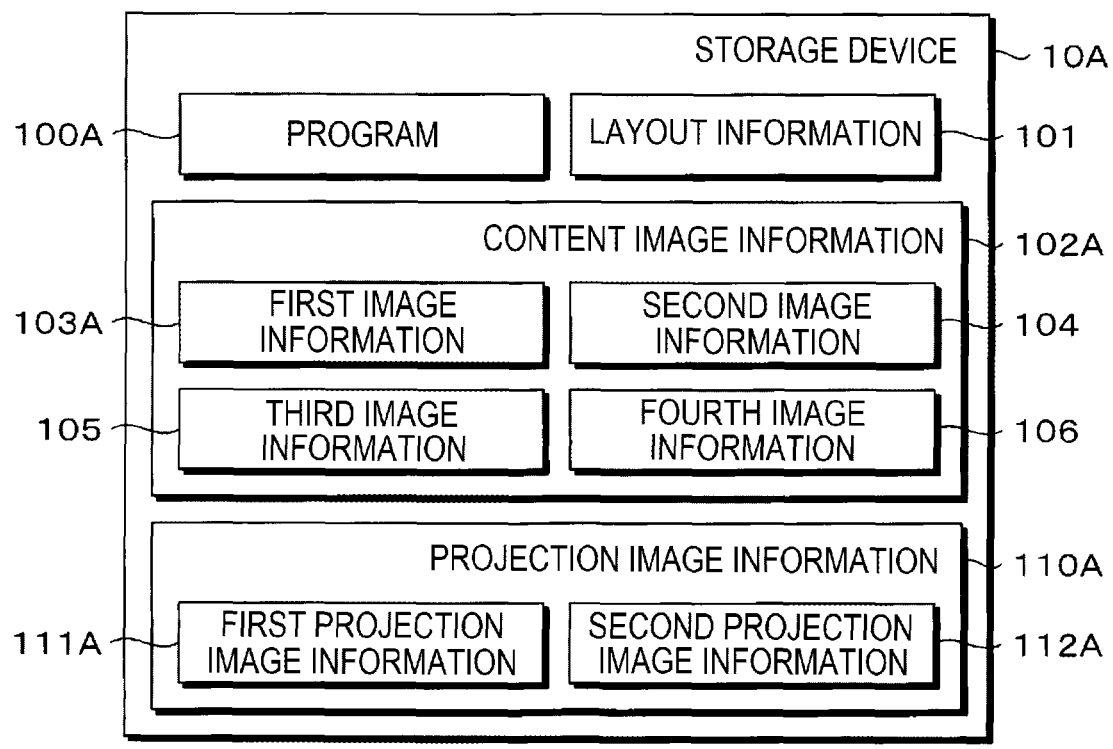
FIG. 11 is a block diagram showing a configuration of a storage device 10A according to the second embodiment.

FIG. 10 is a block diagram showing a configuration of the projector 1A according to the second embodiment. FIG. 11 is a block diagram showing a configuration of a storage device 10A according to the second embodiment.

The projector 1A is similarly configured to the projector 1 according to the first embodiment except the point that the storage device 10A is provided instead of the storage device 10, and the point that a processing device 12A is provided instead of the processing device 12.

The storage device 10A is different from the storage device 10 according to the first embodiment in the point that a program 100A is stored instead of the program 100, the point that content image information 102A is stored instead of the content image information 102, and the point that projection image information 110A is stored instead of the projection image information 110. The content image information 102A is different from the content image information 102 in the point that first image information 103A is included instead of the first image information 103. The projection image information 110A is different from the projection image information 110 in the point that first projection image information 111A is included instead of the first projection image information 111, and the point that second projection image information 112A is included instead of the second projection image information 112.

The processing device 12A is configured similarly to the processing device 12 according to the first embodiment except the point that the processing device 12A has a function as a determination unit 123A instead of the determination unit 123, and the point that the processing device 12A has a function as an image editor 124A instead of the image editor 124. The processing device 12A functions as the input manager 120, the image generator 121, the projection controller 122, the determination unit 123A, and the image editor 124A shown in FIG. 10 by the CPU and so on provided to the processing device 12A executing the program 100A.

Figure 12:
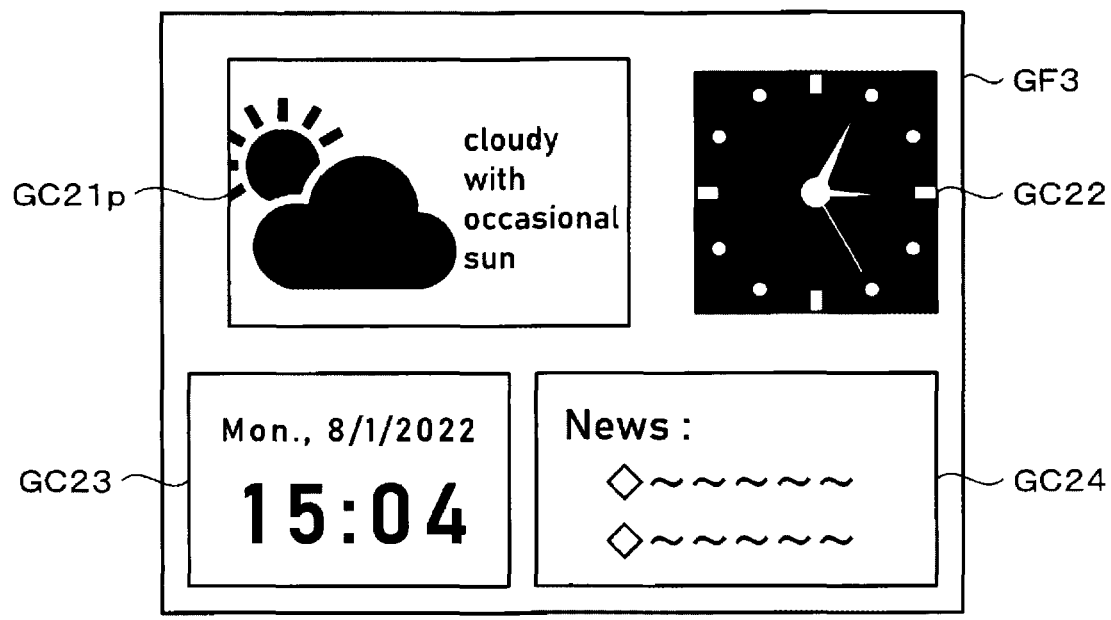
FIG. 12 is a schematic diagram illustrating an example of an image represented by first projection image information 111A.

FIG. 12 is a schematic diagram illustrating an example of an image represented by the first projection image information 111A. In the present embodiment, the first projection image information 111A represents an image GF3. The image GF3 includes a plurality of images. The image GF3 is configured similarly to the image GF1 except the point that the content image GC21p is included instead of the content image GC21. In the present embodiment, the content image GC21p is an image represented by the first image information 103A.

The projector 1A makes the projection mechanism 16 project the projection light based on the first projection image information 111A to thereby display the content image GC11p, the content image GC12, the content image GC13, and the content image GC14 on the wall surface W1. In other words, the projector 1A makes the projection mechanism 16 project the image GF3 to thereby display the content image GC11p, the content image GC12, the content image GC13, and the content image GC14 on the wall surface W1.

The projector 1A generates the first projection image information 111A based on the content image information 102A. Specifically, the projector 1A generates the first projection image information 111A based on the first image information 103A, the second image information 104, the third image information 105, and the fourth image information 106. In other words, the projector 1A generates the image GF3 based on the content image GC21p, the content image GC22, the content image GC23, and the content image GC24.

Figure 13:
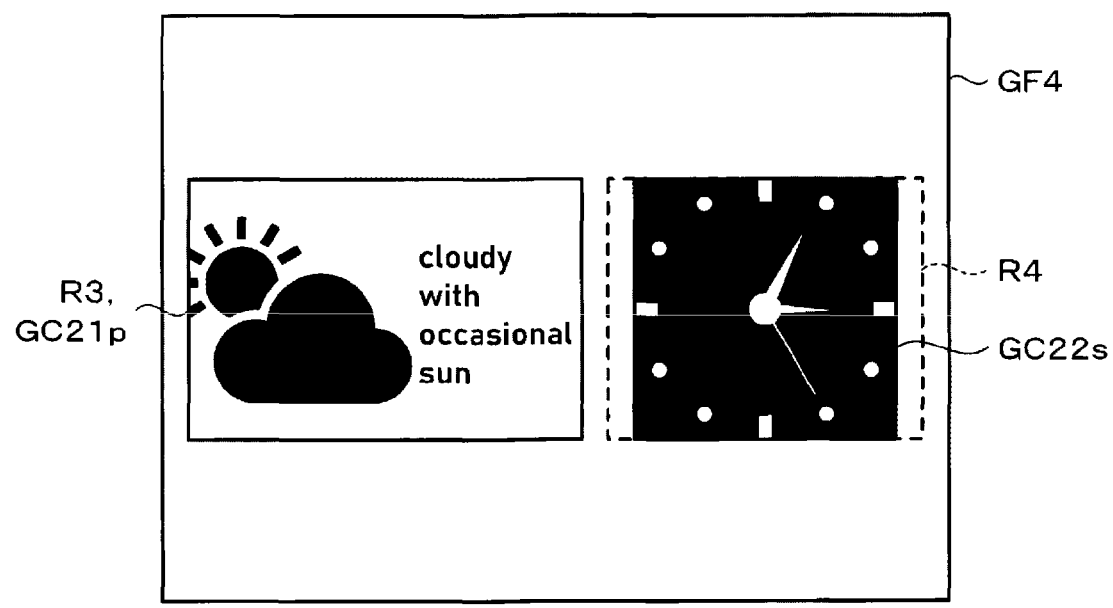
FIG. 13 is a schematic diagram illustrating an example of an image represented by second projection image information 112A.

FIG. 13 is a schematic diagram illustrating an example of an image represented by the second projection image information 112A. In the present embodiment, the second projection image information 112A represents an image GF4. The image GF4 is configured similarly to the image GF2 except the point that a content image GC22s is included instead of the content image GC22. In other words, the content image GC21p is arranged in the region R3 in the image GF4. Further, the content image GC22s is arranged in the region R4 in the image GF4. Further, the image GF4 is an image corresponding to the projection image GP3. The projector 1A makes the projection mechanism 16 project the projection light based on the second projection image information 112A to thereby display the projection image GP3 on the wall surface W1. In other words, the projector 1A makes the projection mechanism 16 project the image GF4 to thereby display the projection image GP3 on the wall surface W1.

The content image GC22s is an image obtained by expanding the content image GC22 in accordance with the shape of the region R4. In other words, the content image GC22s is an image based on the content image GC22. In other words, the content image GC22 is an image to be a base of the content image GC22s. Further, the content image GC22s is an image obtained by deforming the content image GC22. Further, the shape of the content image GC22s is a shape which fits into the region R4. Further, an aspect ratio of the content image GC22s coincides with an aspect ratio of the content image GC22. Further, the content image GC22s is an image corresponding to the content image GC12s.

When the user selects the content image GC11p as the image to be the base of the image to be displayed in the region R1, and selects the content image GC12 as the image to be the base of the image to be displayed in the region R2, the projector 1A generates the second projection image information 112A based on the first image information 103A representing the content image GC21p corresponding to the content image GC11p, the second image information 104 representing the content image GC22 corresponding to the content image GC12, and the layout information 101-1. In other words, the projector 1A generates the image GF4 based on the content image GC21p, the content image GC22, and the layout information 101-1.

In the present embodiment, an operation of selecting one of the pieces of layout information 101 is referred to as a "first operation" in some cases. Further, an operation of determining the image to be the base of the image to be displayed in the region R2 is referred to as a "second operation" in some cases. The second operation includes an operation of selecting the image to be the base of the image to be displayed in the region R2 out of the content image GC11p, the content image GC12, the content image GC13, and the content image GC14. Further, an operation of determining the image to be the base of the image to be displayed in the region R1 is referred to as a "third operation" in some cases. The third operation includes an operation of selecting the image to be the base of the image to be displayed in the region R1 out of the content image GC11p, the content image GC12, the content image GC13, and the content image GC14.

The user selects the layout information 101-1 out of the pieces of layout information 101-1 through 101-N with the first operation. Further, the user selects the content image GC12 out of the content image GC11p, the content image GC12, the content image GC13, and the content image GC14 with the second operation. Further, the user selects the content image GC11p out of the content image GC11p, the content image GC12, the content image GC13, and the content image GC14 with the third operation.

Going back to FIG. 10, the determination unit 123A determines whether or not a shape of the image to be the base of the image to be arranged in the region R4 is different from the shape of the region R4 based on the operation data representing the content of the first operation, the operation data representing the content of the second operation, the layout information 101, and the content image information 102A. In other words, the determination unit 123A determines whether or not the shape of the image to be the base of the image to be displayed in the region R2 is different from the shape of the region R2. In the present embodiment, the determination unit 123A determines whether or not the shape of the content image GC22 is different from the shape of the region R4 based on the layout information 101-1 and the second image information 104. In other words, the determination unit 123A determines whether or not the shape of the content image GC12 is different from the shape of the region R2 based on the layout information 101-1 and the second image information 104.

When the shape of the image to be the base of the image to be arranged in the region R4 is different from the shape of the region R4, the image editor 124A deforms the image to be the base of the image to be arranged in the region R4 in accordance with the shape of the region R4. In other words, when the shape of the image to be the base of the image to be displayed in the region R2 is different from the shape of the region R2, the image editor 124A deforms the image to be the base of the image to be displayed in the region R2 in accordance with the shape of the region R2. In the present embodiment, the image editor 124A deforms the content image GC22 in accordance with the shape of the region R4 to thereby generate the content image GC22s. In other words, the image editor 124A deforms the content image GC12 in accordance with the shape of the region R2 to thereby generate the content image GC12s.

Figure 14:
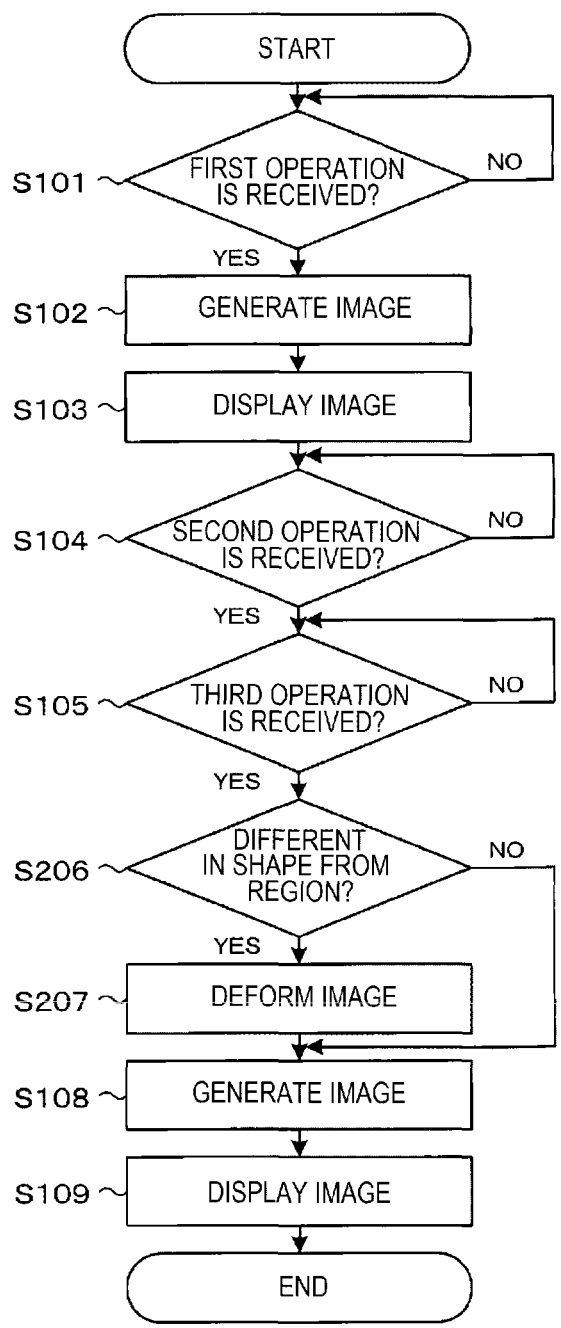
FIG. 14 is a flowchart for explaining an operation of the projector 1A according to the second embodiment.

FIG. 14 is a flowchart for explaining an operation of the projector 1A according to the second embodiment. The flowchart shown in FIG. 14 is substantially the same as the flowchart shown in FIG. 8 except the point that the processing device 12A executes the processing in the step S206 instead of the processing in the step S106, and the point that the processing device 12A executes the processing in the step S207 instead of the processing in the step S107.

In the step S206, the determination unit 123A determines whether or not the shape of the image to be the base of the image to be arranged in the region R4 is different from the shape of the region R4 based on the operation data representing the content of the first operation, the operation data representing the content of the second operation, the layout information 101, and the content image information 102A. In other words, the determination unit 123A determines whether or not the shape of the image to be the base of the image to be displayed in the region R2 is different from the shape of the region R2 based on the operation data representing the content of the first operation, the operation data representing the content of the second operation, the layout information 101, and the content image information 102A. When the shape of the image to be the base of the image to be arranged in the region R4 is different from the shape of the region R4, in other words, when the shape of the image to be the base of the image to be displayed in the region R2 is different from the shape of the region R2, namely YES is determined in the step S206, the determination unit 123A proceeds with the process to the step S207. When the shape of the image to be the base of the image to be arranged in the region R4 coincides with the shape of the region R4, in other words, when the shape of the image to be the base of the image to be displayed in the region R2 coincides with the shape of the region R2, namely NO is determined in the step S206, the determination unit 123A proceeds with the process to the step S108.

Specifically, the determination unit 123A determines whether or not the shape of the content image GC22 is different from the shape of the region R4 based on the layout information 101-1 and the second image information 104. In other words, the determination unit 123A determines whether or not the shape of the content image GC12 is different from the shape of the region R2 based on the layout information 101-1 and the second image information 104. Since the shape of the content image GC22 is different from the shape of the region R4, the determination unit 123A proceeds with the process to the step S207.

In the step S207, the image editor 124A deforms the image to be the base of the image to be arranged in the region R4 in accordance with the shape of the region R4. In other words, the image editor 124A deforms the image to be the base of the image to be displayed in the region R2 in accordance with the shape of the region R2.

Specifically, the image editor 124A deforms the content image GC22 in accordance with the shape of the region R4 designated by the layout information 101-1 to thereby generate the content image GC22s. In other words, the image editor 124A deforms the content image GC12 in accordance with the shape of the region R2 designated by the layout information 101-1 to thereby generate the content image GC12s.

Since the content image GC22 is deformed in the step S207, the image generator 121 generates the image GF4 in the step S108 based on the layout information 101-1, the content image GC21p, and the content image GC22s. Further, in the step S109, the projection controller 122 makes the projection mechanism 16 project the projection light based on the second projection image information 112A to thereby display the projection image GP3 on the wall surface W1. In other words, the projection controller 122 displays the content image GC11p in the region R1 designated by the layout information 101-1. Further, the projection controller 122 displays the content image GC12s in the region R2 designated by the layout information 101-1.

As described above, according to the second embodiment, when the shape of the region where the image is to be displayed and the shape of the image selected by the user are different from each other, the projector 1A displays the image selected by the user after deforming that image in accordance with the shape of that region so that the aspect ratio does not change. In other words, even when the shape of the region designated by the layout information 101 and the shape of the image selected by the user are different from each other, it is possible for the user to display the images in the layout designated by the layout information selected by the user.

As described hereinabove, in the display method according to the second embodiment, when the shape of the region R2 and the shape of the content image GC12 are different from each other, displaying a part or the whole of the image based on the content image GC12 includes deforming the content image GC12 in accordance with the shape of the region R2.

In other words, even when the shape of the content image GC12 selected by the user is the shape which does not fit into the region R2, it is possible for the projector 1A to deform the shape of the content image GC12 into a shape which fits into the region R2. Thus, it is possible for the projector 1A to display the images in the layout designated by the layout information 101 selected by the user.

It should be noted that in the second embodiment, the region R2 is an example of the "first region," and the content image GC12 is an example of the "first input image." Further, an example of "a part or the whole of the image based on the first input image" is the content image GC12s.

Further, in the display method according to the second embodiment, deforming the content image GC12 includes deforming the content image GC12 in accordance with the shape of the region R2 to thereby generate the content image GC12s, displaying a part or the whole of the image based on the content image GC12 includes displaying the content image GC12s in the region R2, and the aspect ratio of the content image GC12s coincides with the aspect ratio of the content image GC12.

In other words, it is possible for the projector 1A to deform the content image GC12 while preventing a change in display aspect of the content image GC12 due to a change in aspect ratio. Thus, it is possible for the projector 1A to display the image without providing the user with an uncomfortable feeling due to the deformation of the content image GC12.

It should be noted that in the second embodiment, the content image GC12s is an example of a "first deformed image."

3. Modified Examples

The embodiments hereinabove described can variously be modified. Specific aspects of modifications will hereinafter be illustrated. Further, two or more aspects arbitrarily selected from the following illustrations can arbitrarily be combined unless conflicting with each other. It should be noted that in each of the modified examples hereinafter illustrated, regarding the elements substantially the same in operation and function as those in the embodiments described above, the symbols used in the above description are diverted to arbitrarily omit the detailed description of each of such elements.

3.1. Modified Example 1

In the embodiments described above, there is illustrated when the aspect ratio of the image selected by the user does not change when the image selected by the user is deformed, but the present disclosure is not limited to such an aspect. For example, the shape of the image to be generated by deforming the image selected by the user can coincide with the shape of the region where the image is to be displayed.

It should be noted that in Modified Example 1, it is assumed when the user selects the layout information 101-1 out of the pieces of layout information 101-1 through 101-N similarly to the embodiments described above.

Figure 15:
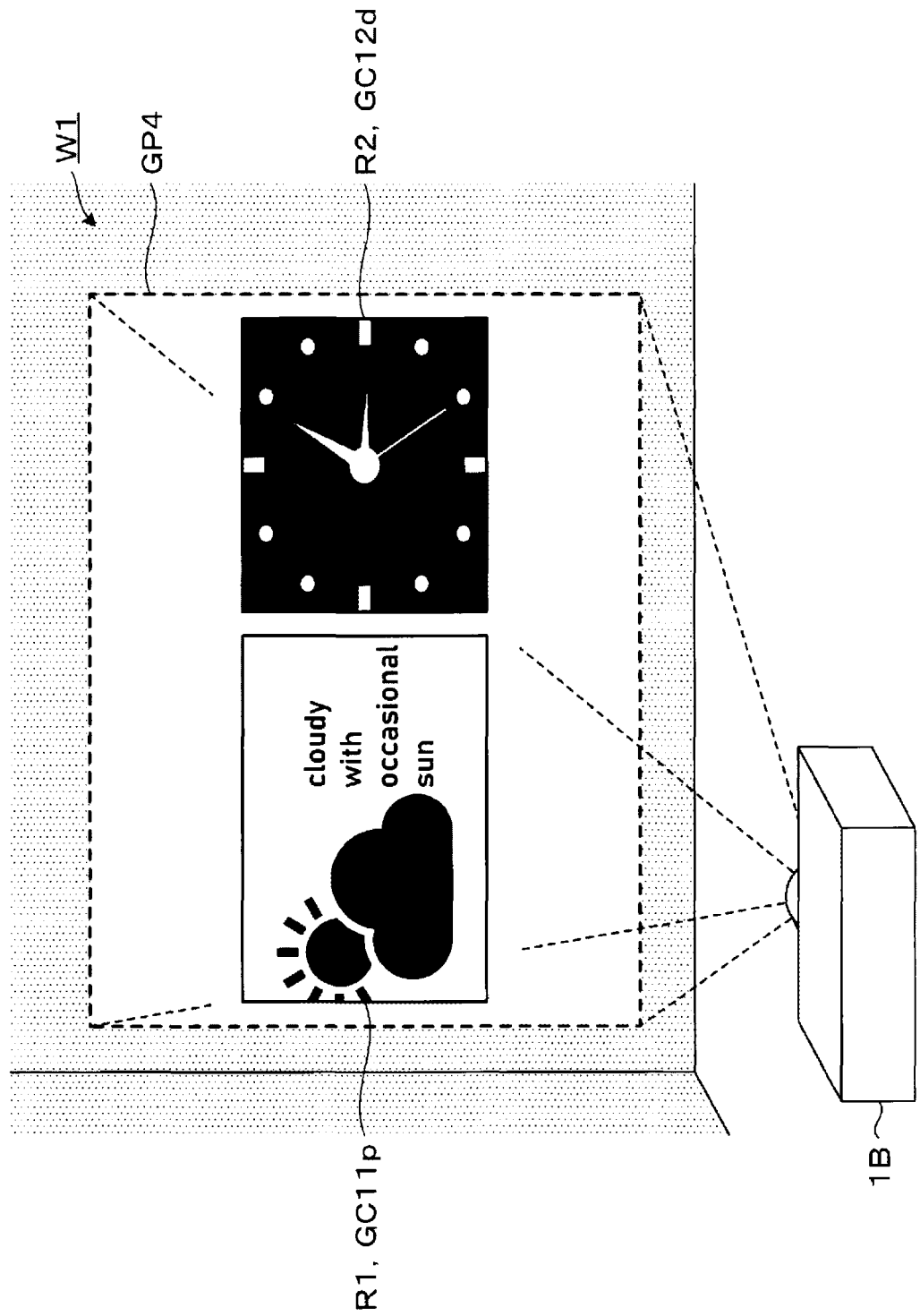
FIG. 15 is a schematic diagram illustrating a state in which a projection image GP4 is displayed.

FIG. 15 is a schematic diagram illustrating a state in which a projection image GP4 is displayed. When the user selects the content image GC11p as the image to be the base of the image to be displayed in the region R1, and selects the content image GC12 as the image to be the base of the image to be displayed in the region R2, a projector 1B according to Modified Example 1 projects the projection light to thereby display the projection image GP4 on the wall surface W1. The projection image GP4 is configured similarly to the projection image GP3 except the point that a content image GC12d is included instead of the content image GC12s. Specifically, the content image GC11p is displayed in the region R1. Further, the content image GC12d is displayed in the region R2. In other words, the projector 1B controls the projection mechanism 16 to thereby display the content image GC11p in the region R1 designated by the layout information 101-1. Further, the projector 1B controls the projection mechanism 16 to thereby display the content image GC12d in the region R2 designated by the layout information 101-1.

The content image GC12d is an image obtained by deforming the content image GC12 in accordance with the shape of the region R2. In other words, the content image GC12d is an image based on the content image GC12. In other words, the content image GC12 is an image to be a base of the content image GC12d. Further, a shape of the content image GC12d coincides with the shape of the region R2. The projector 1B deforms the content image GC12 in accordance with the shape of the region R2 designated by the layout information 101-1 to thereby generate the content image GC12d. Therefore, the aspect ratio of the content image GC12 and an aspect ratio of the content image GC12d are different from each other.

As described above, according to Modified Example 1, when the shape of the region where the image is to be displayed and the shape of the image selected by the user are different from each other, the projector 1B deforms the image selected by the user to thereby make the shape of the image selected by the user coincide with the shape of that region. In other words, even when the shape of the region designated by the layout information 101 and the shape of the image selected by the user are different from each other, it is possible for the user to display the images in the layout designated by the layout information selected by the user.

As described hereinabove, in the display method according to Modified Example 1, deforming the content image GC12 includes deforming the content image GC12 in accordance with the shape of the region R2 to thereby generate the content image GC12d, displaying a part or the whole of the image based on the content image GC12 includes displaying the content image GC12d in the region R2, and the shape of the content image GC12d coincides with the shape of the region R2.

Thus, it is possible for the user to deform the shape of the content image GC12 selected by the user in accordance with the layout designated by the layout information 101 selected by the user.

It should be noted that in Modified Example 1, the content image GC12 is an example of the "first input image," the region R2 is an example of the "first region," and the content image GC12d is an example of a "second deformed image."

Further, an example of "a part or the whole of the image based on the first input image" is the content image GC12*d*.

3.2. Modified Example 2

In the embodiments and the modified example described above, there is illustrated when the image selected by the user is trimmed or deformed in accordance with the shape of the region where the image is to be displayed, but the present disclosure is not limited to such an aspect. It is possible for the user to select an image out of images having substantially the same shapes as the shape of the region where the image is to be displayed. In other words, a display device according to the present modified example displays the image selected by the user in the region where the image is to be displayed without modification. Thus, it is possible for the display device according to the present modified example to omit the processing for editing the image in accordance with the shape of the region where the image is to be displayed.

It should be noted that in Modified Example 2, it is assumed when the user selects the layout information 101-1 out of the pieces of layout information 101-1 through 101-N similarly to the embodiments described above.

Figure 16:
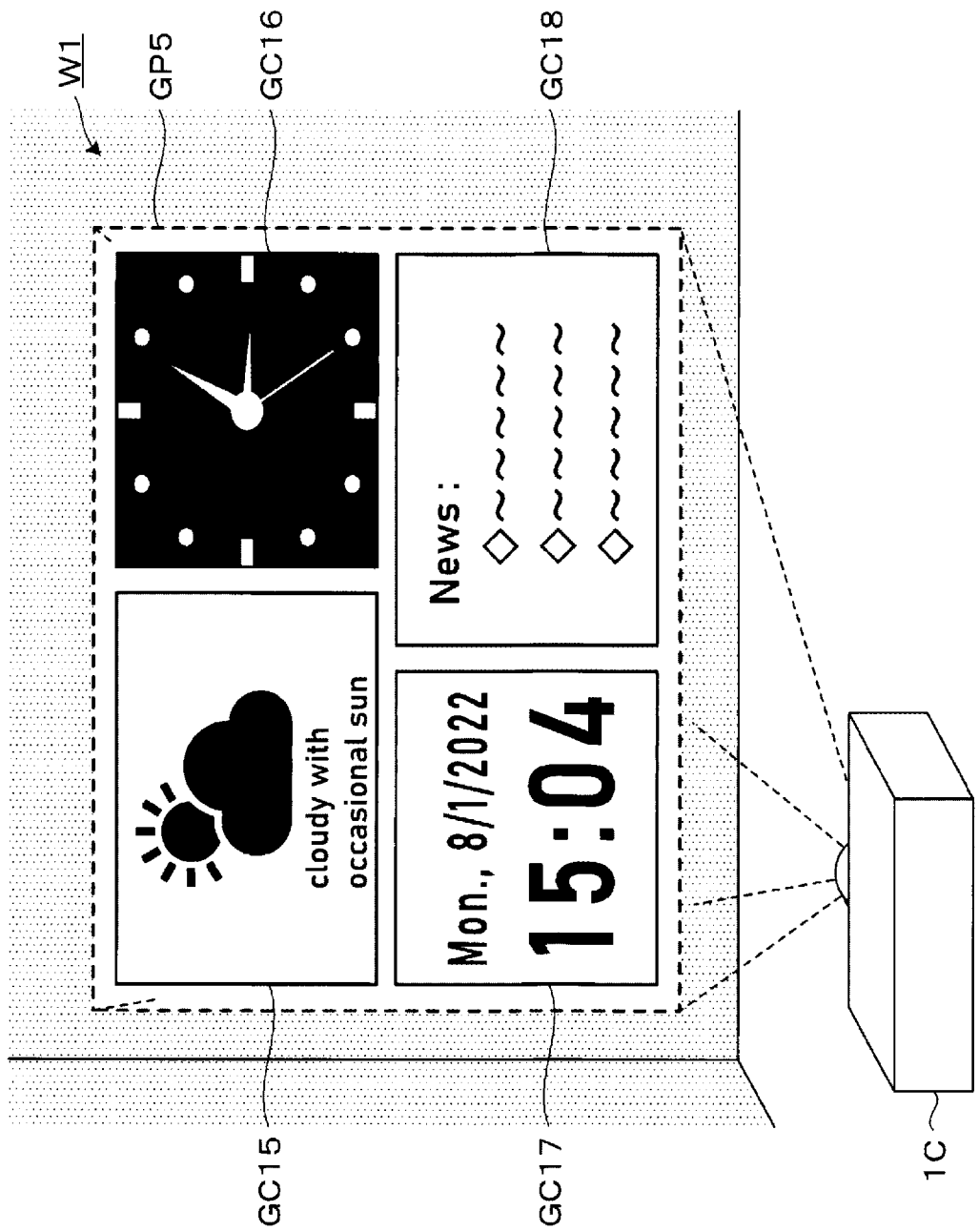
FIG. 16 is a schematic diagram illustrating a state in which a projection image GP5 is displayed.

FIG. 16 is a schematic diagram illustrating a state in which a projection image GP5 is displayed. A projector iC according to Modified Example 2 is installed in an arrangement capable of projecting the projection light toward the wall surface W1. Further, the projector 1C projects the projection light to thereby display the projection image GP5 on the wall surface W1.

The projection image GP5 includes a content image GC15, a content image GC16, a content image GC17, and a content image GC18. The content images GC15 through GC18 are each an image showing a content to be disclosed to the user. Each of the content images GC15 through GC18 can be a still image, or can also be a moving image.

Shapes of the content image GC15 and the content image GC18 coincide with the shape of the region R1. Further, shapes of the content image GC16 and the content image GC17 coincide with the shape of the region R2.

In the present modified example, an operation of selecting one of the pieces of layout information 101 is referred to as the "first operation" in some cases. Further, an operation of determining the image to be the base of the image to be displayed in the region R1 is referred to as the "second operation" in some cases. The second operation includes an operation of selecting the image to be the base of the image to be displayed in the region R1 out of the content image GC15 and the content image GC18. Further, an operation of determining the image to be the base of the image to be displayed in the region R2 is referred to as the "third operation" in some cases. The third operation includes an operation of selecting the image to be the base of the image to be displayed in the region R2 out of the content image GC16 and the content image GC17.

The user selects the layout information 101-1 out of the pieces of layout information 101-1 through 101-N with the first operation. Further, the user selects the content image GC15 out of the content image GC15 and the content image GC18 with the second operation. Further, the user selects the content image GC16 out of the content image GC16 and the content image GC17 with the third operation. In other words, the projector 1C controls the projection mechanism 16 to thereby display the content image GC15 in the region R1 designated by the layout information 101-1. Further, the projector 1C controls the projection mechanism 16 to thereby display the content image GC16 in the region R2 designated by the layout information 101-1.

As described hereinabove, in the display method according to Modified Example 2, there is further included displaying a plurality of candidate images including the content image GC15, wherein the second operation includes an operation of selecting the content image GC15 out of the plurality of candidate images, shapes of the plurality of candidate images coincide with the shape of the region R1, and displaying a part or the whole of the image based on the content image GC15 includes displaying the content image GC15 in the region R1.

In other words, the projector 1C displays the content image GC15 selected by the user in the region R1 where the image is to be displayed without modification. Thus, it is possible for the projector 1C to omit the processing for editing the image in accordance with the shape of the region where the image is to be displayed.

It should be noted that in Modified Example 2, the content image GC15 is an example of the "first input image," and the region R1 is an example of the "first region." Further, an example of "a part or the whole of the image based on the first input image" is the content image GC15. Further, an example a "plurality of candidate images" is the content image GC15 and the content image GC18.

Further, a timing at which the content image GC15 and the content image GC18 are displayed and a timing at which the content image GC16 and the content image GC17 are displayed can be different from each other. For example, it is possible for the content image GC16 and the content image GC17 to be displayed after the user selects the content image GC15 out of the content image GC15 and the content image GC18.

3.3. Modified Example 3

In the embodiments and the modified examples described above, there are described the display method and the display device according to the present disclosure illustrating the projector for projecting the image, but the present disclosure is not limited to such an aspect. The display device according to the present disclosure is not limited to the projector, and it is possible to use, for example, a direct-view display device. Specifically, it is possible to adopt a configuration provided with an optical device for displaying the image directly toward the user instead of the projection mechanism 16 for projecting the projection light for displaying the image to the projection surface. More specifically, the display device can be a monitor provided with a display panel such as a liquid crystal panel, an organic EL panel, or a micro LED panel as the optical device.

4. Supplementary Notes

The conclusion of the present disclosure will hereinafter be described as supplementary notes.

4.1. Supplementary Note 1

A display method including receiving a first operation of selecting one of a plurality of pieces of layout information for designating a first region and a second region different from the first region from a user, receiving a second operation of determining a first input image to be a base of an image to be displayed in the first region from the user, displaying a part or a whole of an image based on the first input image in the first region designated by the one of the plurality of pieces of layout information, receiving a third operation of determining a second input image to be a base of an image to be displayed in the second region from the user, and displaying a part or a whole of an image based on the second input image in the second region designated by the one of the plurality of pieces of layout information.

Specifically, the display device realizing the display method described in Supplementary Note 1 displays the image based on the image selected by the user based on the layout information selected by the user out of the plurality of pieces of layout information. Thus, it is possible for the display device realizing the display method described in Supplementary Note 1 to increase the degree of freedom of the layout of the images to be displayed compared to when the layout of the images to be displayed is associated with the images themselves to be displayed. Therefore, it is possible for the user to display the images selected by the user him- or herself in the layout based on the layout information selected by the user him- or herself.

4.2. Supplementary Note 2

The display method described in Supplementary Note 1 further including displaying a plurality of input images including the first input image and the second input image, wherein the second operation includes an operation of selecting the first input image out of the plurality of input images, and the third operation includes an operation of selecting the second input image out of the plurality of input images.

Specifically, the display device realizing the display method described in Supplementary Note 2 displays the images to be selected by the user as a list. Thus, it is possible for the user to figure out a display aspect of the images to be selected by the user.

4.3. Supplementary Note 3

The display method described in one of Supplementary Note 1 and Supplementary Note 2, wherein when a shape of the first region and a shape of the first input image are different from each other, the displaying a part or the whole of the image based on the first input image includes displaying a part or a whole of the first input image in the first region in accordance with the shape of the first region.

Specifically, the display device realizing the display method described in Supplementary Note 3 displays the first input image in the first region when the first input image selected by the user fits into the first region. Further, the display device realizing the display method described in Supplementary Note 3 displays a part of the first input image in the first region when the first input image selected by the user fails to fit into the first region. Thus, even when the shape of the first region designated by the layout information selected by the user and the shape of the first input image selected by the user are different from each other, it is possible for the display device realizing the display method described in Supplementary Note 3 to display the images in the layout designated by the layout information selected by the user.

4.4. Supplementary Note 4

The display method described in one of Supplementary Note 1 and Supplementary Note 2, wherein when a shape of the first region and a shape of the first input image are different from each other, the displaying a part or the whole of the image based on the first input image includes deforming the first input image in accordance with the shape of the first region.

Specifically, even when the shape of the first input image selected by the user is a shape which fails to fit into the first region, it is possible for the display device realizing the display method described in Supplementary Note 4 to deform the shape of the first input image into a shape which fits into the first region. Thus, it is possible for the display device realizing the display method described in Supplementary Note 4 to display the images in the layout designated by the layout information selected by the user.

4.5. Supplementary Note 5

The display method described in Supplementary Note 4, wherein the deforming the first input image includes deforming the first input image in accordance with the shape of the first region to thereby generate a first deformed image, the displaying a part or the whole of the image based on the first input image includes displaying the first deformed image in the first region, and an aspect ratio of the first deformed image coincides with an aspect ratio of the first input image.

Specifically, it is possible for the display device realizing the display method described in Supplementary Note 5 to deform the first input image while preventing the change in display aspect of the first input image due to the change in aspect ratio. Thus, it is possible for the display device realizing the display method described in Supplementary Note 5 to display the first deformed image obtained by deforming the first input image without providing the user with an uncomfortable feeling due to the deformation of the first input image.

4.6. Supplementary Note 6

The display method described in Supplementary Note 4, wherein the deforming the first input image includes deforming the first input image in accordance with the shape of the first region to thereby generate a second deformed image, the displaying a part or the whole of the image based on the first input image includes displaying the second deformed image in the first region, and a shape of the second deformed image coincides with the shape of the first region.

Thus, it is possible for the user of the display device realizing the display method described in Supplementary Note 6 to deform the shape of the first input image selected by the user in accordance with the layout designated by the layout information selected by the user.

4.7. Supplementary Note 7

The display method described in Supplementary Note 1 further including displaying a plurality of candidate images including the first input image, wherein the second operation includes an operation of selecting the first input image out of the plurality of candidate images, shapes of the plurality of candidate images coincide with the shape of the first region, and the displaying a part or the whole of the image based on the first input image includes displaying the first input image in the first region.

Specifically, the display device realizing the display method described in Supplementary Note 7 displays the first input image selected by the user in the first region where the image is to be displayed without modification. Thus, it is possible for the display device realizing the display method described in Supplementary Note 7 to omit the processing for editing the image in accordance with the shape of the region where the image is to be displayed.

4.8. Supplementary Note 8

A display device including an optical device, and a processing device, wherein the processing device executes receiving a first operation of selecting one of a plurality of pieces of layout information for designating a first region and a second region different from the first region from a user, receiving a second operation of determining a first input image to be a base of an image to be displayed in the first region from the user, controlling the optical device to thereby display a part or a whole of an image based on the first input image in the first region designated by the one of the plurality of pieces of layout information, receiving a third operation of determining a second input image to be a base of an image to be displayed in the second region from the user, and controlling the optical device to thereby display a part or a whole of an image based on the second input image in the second region designated by the one of the plurality of pieces of layout information.

Specifically, the display device described in Supplementary Note 8 displays the image based on the image selected by the user based on the layout information selected by the user out of the plurality of pieces of layout information. Thus, it is possible for the display device described in Supplementary Note 8 to increase the degree of freedom of the layout of the images to be displayed compared to when the layout of the images to be displayed is associated with the images themselves to be displayed. Therefore, it is possible for the user to display the images selected by the user him- or herself in the layout based on the layout information selected by the user him- or herself.

What is claimed is:

1. A display method comprising:
   receiving a first operation of selecting one of a plurality of pieces of layout information for designating a first region and a second region different from the first region from a user;
   receiving a second operation of determining a first input image to be a base of an image to be displayed in the first region from the user;
   displaying a part or a whole of an image based on the first input image in the first region designated by the one of the plurality of pieces of layout information;
   receiving a third operation of determining a second input image to be a base of an image to be displayed in the second region from the user; and
   displaying a part or a whole of an image based on the second input image in the second region designated by the one of the plurality of pieces of layout information, wherein
   when a shape of the first region and a shape of the first input image are different from each other, the displaying a part or the whole of the image based on the first input image includes deforming the first input image in accordance with the shape of the first region, and
   an aspect ratio of the first deformed image coincides with an aspect ratio of the first input image.

2. The display method according to claim 1, further comprising:
   displaying a plurality of input images including the first input image and the second input image, wherein the second operation includes an operation of selecting the first input image out of the plurality of input images, and
the third operation includes an operation of selecting the second input image out of the plurality of input images.

3. The display method according to claim 1, wherein
the deforming the first input image includes deforming the first input image in accordance with the shape of the first region to thereby generate a first deformed image,
the displaying a part or the whole of the image based on the first input image includes displaying the first deformed image in the first region.

4. The display method according to claim 1, wherein
the deforming the first input image includes deforming the first input image in accordance with the shape of the first region to thereby generate a second deformed image,
the displaying a part or the whole of the image based on the first input image includes displaying the second deformed image in the first region, and
a shape of the second deformed image coincides with the shape of the first region.

5. The display method according to claim 1, further comprising:
   displaying a plurality of candidate images including the first input image, wherein
   the second operation includes an operation of selecting the first input image out of the plurality of candidate images,
   shapes of the plurality of candidate images coincide with the shape of the first region, and
   the displaying a part or the whole of the image based on the first input image includes displaying the first input image in the first region.

6. A display device comprising:
   an optical device; and
   a processing device programmed to execute
      receiving a first operation of selecting one of a plurality of pieces of layout information for designating a first region and a second region different from the first region from a user,
      receiving a second operation of determining a first input image to be a base of an image to be displayed in the first region from the user,
      displaying, by controlling the optical device, a part or a whole of an image based on the first input image in the first region designated by the one of the plurality of pieces of layout information,
      receiving a third operation of determining a second input image to be a base of an image to be displayed in the second region from the user, and
      displaying, by controlling the optical device, a part or a whole of an image based on the second input image in the second region designated by the one of the plurality of pieces of layout information, wherein
   when a shape of the first region and a shape of the first input image are different from each other, the displaying a part or the whole of the image based on the first input image includes deforming the first input image in accordance with the shape of the first region, and
   an aspect ratio of the first deformed image coincides with an aspect ratio of the first input image.

7. The display device according to claim 6, the processing device further programmed to execute:
   displaying a plurality of input images including the first input image and the second input image, wherein the second operation includes an operation of selecting the first input image out of the plurality of input images, and the third operation includes an operation of selecting the second input image out of the plurality of input images.

8. The display device according to claim 6, wherein the processing device is further programmed to execute that the deforming the first input image includes deforming the first input image in accordance with the shape of the first region to thereby generate a first deformed image, the displaying a part or the whole of the image based on the first input image includes displaying the first deformed image in the first region.

9. The display device according to claim 6, wherein the processing device is further programmed to execute that the deforming the first input image includes deforming the first input image in accordance with the shape of the first region to thereby generate a second deformed image, the displaying a part or the whole of the image based on the first input image includes displaying the second deformed image in the first region, and a shape of the second deformed image coincides with the shape of the first region.

10. The display device according to claim 6, wherein the processing device is further programmed to execute:

displaying a plurality of candidate images including the first input image, wherein the second operation includes an operation of selecting the first input image out of the plurality of candidate images, shapes of the plurality of candidate images coincide with the shape of the first region, and the displaying a part or the whole of the image based on the first input image includes displaying the first input image in the first region.

* * * * *